(12) United States Patent
Suzuki

(10) Patent No.: US 7,583,981 B2
(45) Date of Patent: Sep. 1, 2009

(54) MOBILE STATION AND WEIGHTING CONTROL METHOD

(75) Inventor: Masaaki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1037 days.

(21) Appl. No.: 11/166,034

(22) Filed: Jun. 24, 2005

(65) Prior Publication Data
US 2006/0209883 A1 Sep. 21, 2006

(30) Foreign Application Priority Data
Mar. 16, 2005 (JP) ............................. 2005-074220

(51) Int. Cl.
*H04B 1/04* (2006.01)
(52) U.S. Cl. ............... 455/562.1; 455/277.1; 455/278.1
(58) Field of Classification Search ................. None
See application file for complete search history.

(56) References Cited

U.S. PATENT DOCUMENTS

| 7,236,479 | B2 * | 6/2007 | Kim ........................... 455/442 |
| 7,391,831 | B2 * | 6/2008 | Lim ........................... 375/347 |
| 2006/0176858 | A1 * | 8/2006 | Ishii et al. .................... 370/334 |

OTHER PUBLICATIONS

3 GPP TS 25.212 V6.2.0. $3^{RD}$ Generation Partnership Project; Technical Specification Group Radio Access Network; Multiplexing and channel coding (FDD) Jun. 2004.
3 GPP TS 25.214 V6.2.0. $3^{RD}$ Generation Partnership Project; Technical Specification Group Radio Access Network; Physical Layer procedures (FDD) Jun. 2004.
TSG-RAN Working Group 1 Meeting #29. Further Simulation Results on Fast Switching Proposal. Nov. 5-8, 2002.

* cited by examiner

*Primary Examiner*—Thanh C Le
(74) *Attorney, Agent, or Firm*—Katten Muchin Rosenman LLP

(57) ABSTRACT

In a first state in which the same voice data is being received from a plurality of base stations on a first channel (DPCH) and a packet is not being received on a second channel (HS-PDSCH), weight is decided in such a manner that first weighting is applied to signals received from respective ones of the base stations and prescribed control is performed based upon the signals to which the first weighting has been applied. In a second state in which the same voice data is being received from a plurality of base stations on the first channel and a packet is not being received on the second channel, weight is decided in such a manner that second weighting is applied to signals received from respective ones of the base stations and prescribed control is performed based upon the signals to which the second weighting has been applied. When the second state has changed to the first state, transition time (protection time) TMR at which there is a transition from second weighting to first weighting is controlled adaptively.

20 Claims, 17 Drawing Sheets

FIG. 4
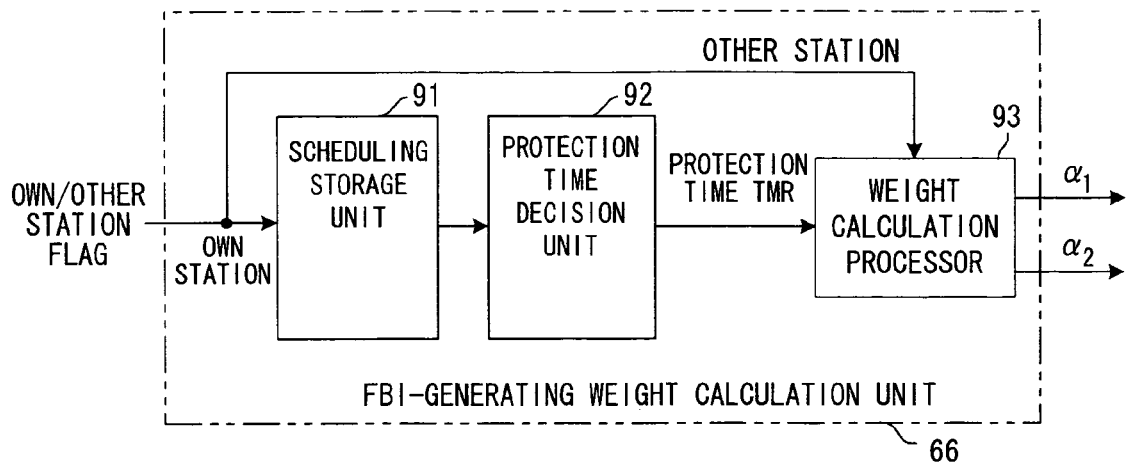
(A)
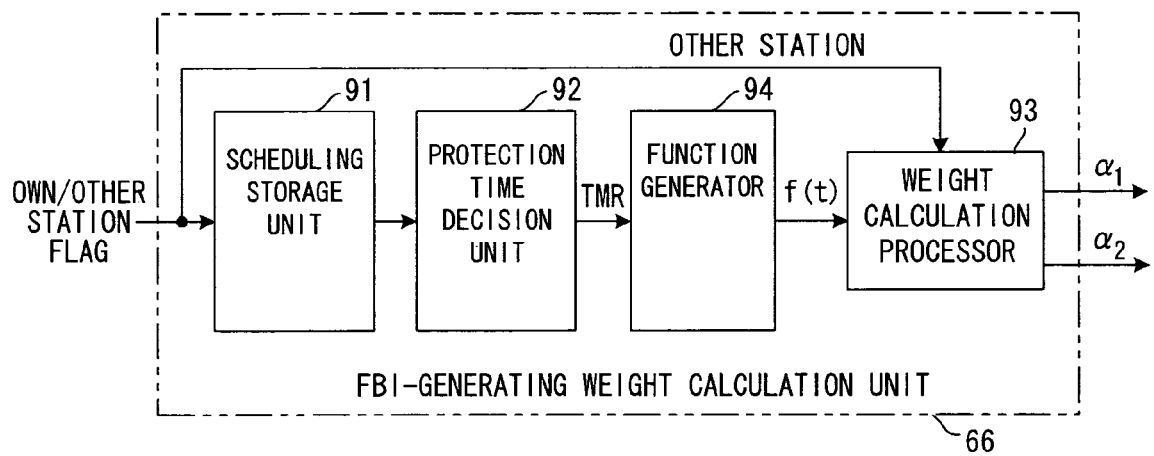
(B)
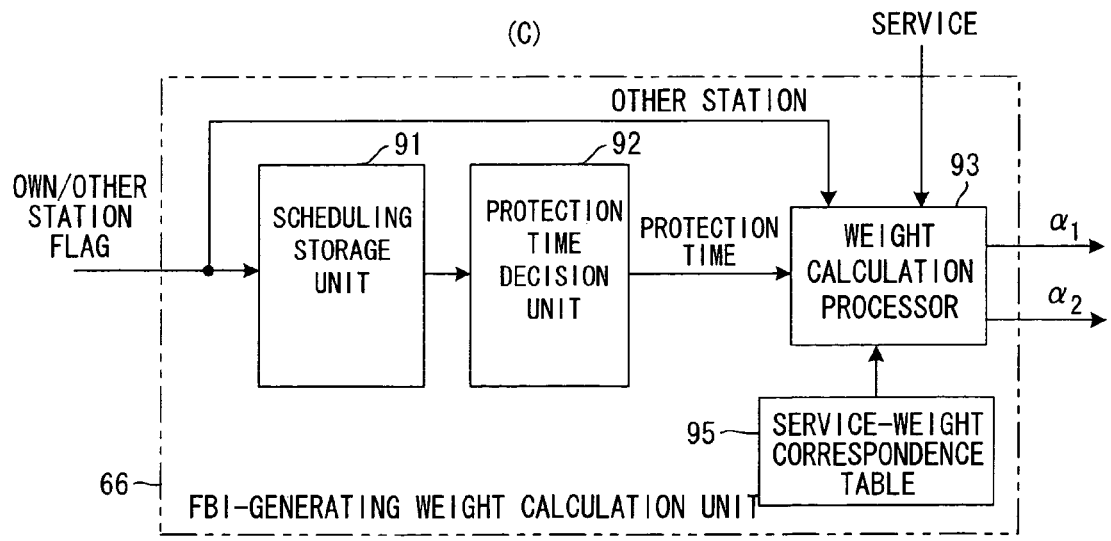
(C)

FIG. 7
(A)
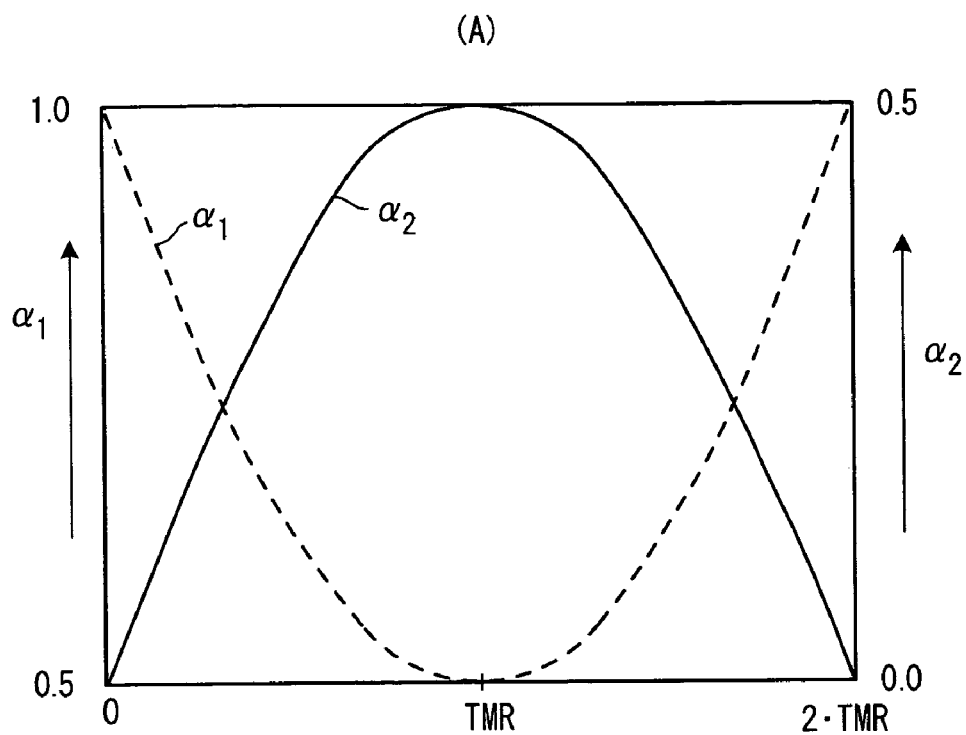
(B)
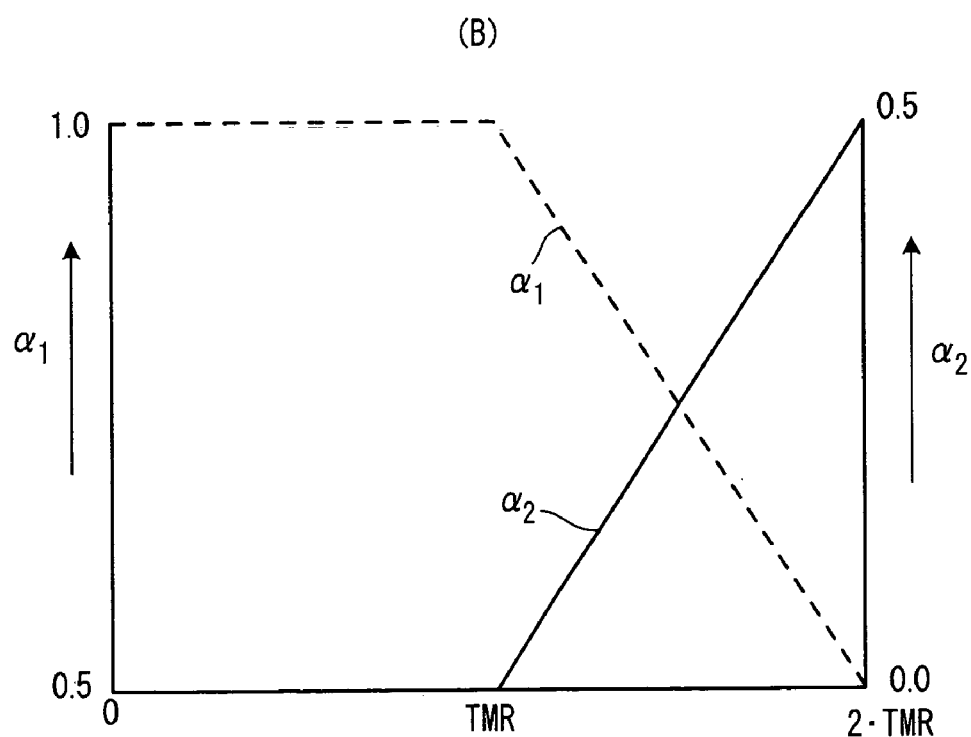

FIG. 15 PRIOR ART
(A)
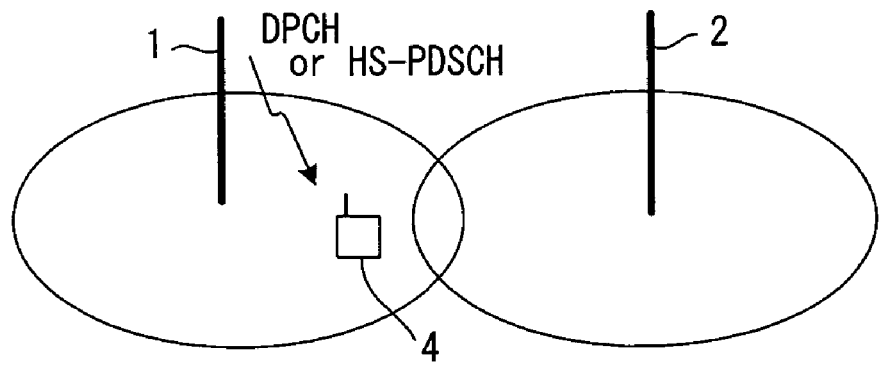
(B)
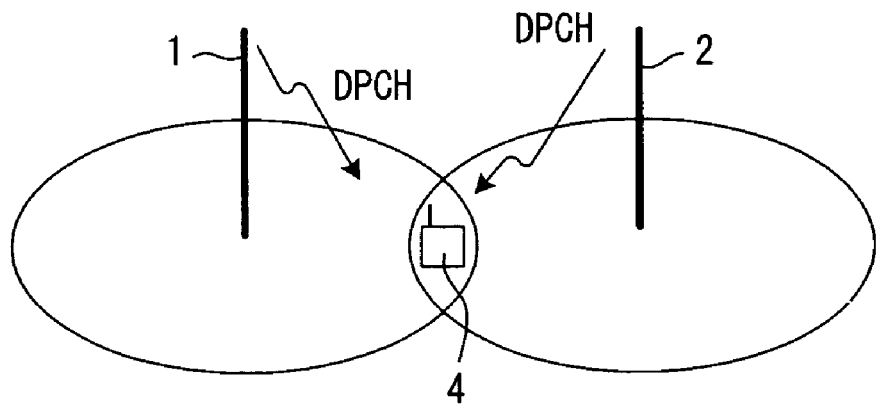
(C)
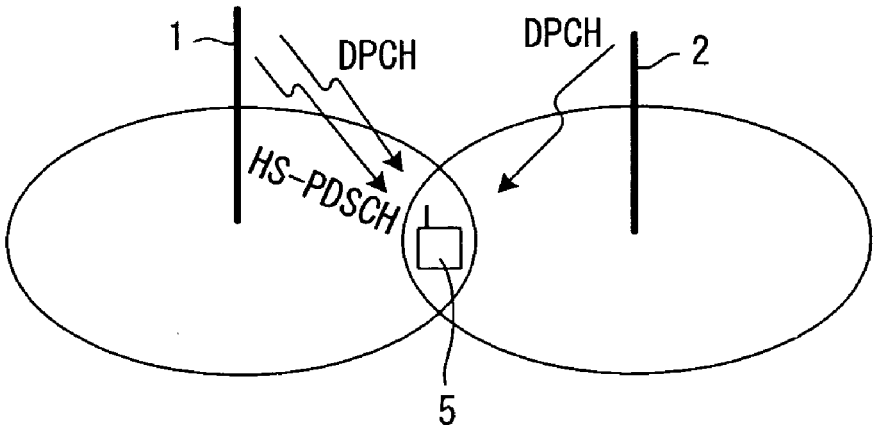

MOBILE STATION AND WEIGHTING CONTROL METHOD

BACKGROUND OF THE INVENTION

This invention relates to a mobile station and weighting control method. More particularly, the invention relates to a mobile station, and to a method of controlling weighting of the mobile station, in a communication system for transmitting the same data from a plurality of base stations to a mobile station on a first channel and transmitting other data from one base station to the mobile station intermittently on a second channel during communication on the first channel.

Closed-Loop Transmit Diversity System

In a closed-loop transmit diversity system, a radio base station of a cellular mobile communication system is provided with a plurality of an antenna elements. The system (1) subjects a plurality of identical transmit data signals to different amplitude and phase control based upon feedback information that is sent from a mobile station, (2) multiplexes pilot signals onto the transmit data that has undergone the amplitude and phase control and transmits the resultant signals using different antennas, and (3) again decides the feedback information (amplitude and amount of phase control) using downlink pilot signals, multiplexes the information onto an uplink channel signal and transmits the resultant signal to the side of the base station. The above-described operation is thenceforth repeated.

With closed-loop transmit diversity in W-CDMA, which is a third-generation mobile communication system, a scheme that uses two transmit antennas is employed, as illustrated in FIG. 9. In FIG. 9, mutually orthogonal pilot patterns $P_1$, $P_2$ are generated in a pilot signal generator 11, the signals are incorporated into transmit data in combiners $CB_1$, $CB_2$ and transmitted from transmit antennas 10-1, 10-2, respectively. A channel estimation unit (not shown) on the receiving side of a mobile station correlates the receive pilots signals and corresponding known pilot patterns, whereby it is possible to estimate channel-impulse response vectors $h_1$, $h_2$ from the transmit antennas 10-1, 10-2 of the base station to a receive antenna 12 at the mobile station.

A weighting calculation unit 13 uses these channel estimation values to calculate an amplitude and phase control vector (weight vector) $w=[w_1, w_2]^T$ of the transmit antennas 10-1, 10-2 of the base station, which vector maximizes power P indicated by Equation (1) below. The vector is quantized, multiplexed onto the uplink channel signal as feedback information and transmitted to the side of the base station. It should be noted that it is unnecessary to transmit both values $w_1$, $w_2$, it being sufficient to transmit only the value $w_2$ in a case where $w_1$ is obtained as $w_1=1$.

$$P=w^H H^H H w \quad (1)$$

$$H=[h_1, h_2] \quad (2)$$

Here $h_1$, $h_2$, represent the channel-impulse response vectors from the transmit antennas 10-1 and 10-2, respectively. Further, the suffix H at the upper right of $H^H$ and $w^H$ indicates taking the Hermitian conjugate of H and w.

The mobile station calculates the weighting coefficients (weight vector) in the weighting calculation unit 13, multiplexes the weighting coefficient onto the uplink transmit data as feedback information FBI using a multiplexer 18 and transmits the information to the base station from a transmit antenna 14.

At the base station the feedback information from the mobile station is received by a receive antenna 15, the weighting coefficients $w_1$, $w_2$, which are the control quantities, are extracted by a feedback information extraction unit 16, and an amplitude and phase controller 17 multiplies the downlink transmit data by the weighting coefficients $w_1$, $w_2$ using multipliers $MP_1$, $MP_2$ and controls the amplitude and phase of the signals transmitted from the transmit antennas 10-1, 10-2. As a result, the mobile station is capable of receiving the signals transmitted from the two diversity transmit antennas 10-1, 10-2 in an efficient manner.

Feedback Information FBI

Two methods are stipulated in W-CDMA, namely a mode 1, in which the weighting coefficient $w_2$ is quantized to one bit, and a mode 2, in which the weighting coefficient $w_2$ is quantized to four bits. Mode 1 is a method of exercising control in such a manner that the phases of receive signals from each of the transmit antennas will be made approximately the same phase at a resolution of $\pi/4$. In mode 1, 1-bit feedback information is transmitted every slot. Control is performed upon finding a phase control amount from two slots of information (an even slot indicates either 0 or $\pi$ by a single bit, an odd slot indicates either $\pi/2$ or $3\pi/2$ by a single bit, and the information is the average of these). As a result, control speed is high but accurate control cannot be performed because quantization is coarse. In mode 2, however, control is performed in such a manner that the phases of receive signals from each of the transmit antennas is made approximately the same phase at a resolution of $\pi/4$, and the ratio of transmission power of the transmission signal from each transmit antenna is controlled, with 4-bit information being used to achieve this control. As a result, highly accurate control can be achieved. However, one bit at a time is transmitted in each slot and one word of feedback information is transmitted in four slots. If the fading frequency is high, therefore, follow-up will not be possible and a degraded characteristic will result.

FIG. 10 is a diagram showing the structure of an uplink DPCH (Dedicated Physical Channel) frame standardized by the $3^{rd}$ Generation Partnership Project (referred to as "3GPP" below). A DPDCH (Dedicated Physical Data Channel) on which only transmit data is transmitted and a DPCCH (Dedicated Physical Control Channel) on which a pilot and control data such as feedback information are multiplexed and transmitted are multiplexed by orthogonal codes. More specifically, in the frame format of an uplink signal from a mobile station to a base station, one frame has a duration of 10 ms and is composed of 15 slots (slot #0 to slot #14). The DPDCH is mapped to an orthogonal I channel of QPSK modulation and the DPCCH is mapped to an orthogonal Q channel of QPSK modulation. Each slot of the DPDCH consists of n bits, and n varies in accordance with the symbol rate. Each slot of the DPCCH consists of ten bits, has a symbol rate of a constant 15 ksps and transmits a pilot PILOT, transmission power control data TPC, a transport format combination indicator TFCI and feedback information FBI. The PILOT is utilized on the receiving side to perform channel estimation (estimation of propagation path characteristics) and when measuring SIR. The TFCI transmits the symbol speed of data and the number of bits per frame, etc. The FBI transmits the above-mentioned feedback information (weighting coefficients) for controlling the transmit diversity at the base station.

Structure of Radio Mobile Station

FIG. 11 illustrates an example of the structure of a radio mobile station. A downlink data signal from the base station is received by the receive antenna 12 and sent to a data channel despreader 20 and pilot channel despreader 22. The data channel is despread by the data channel despreader 20 and the pilot channel by the pilot channel despreader 22.

Despread pilot signals $P_1'$, $P_2'$, which are the result of processing by the pilot channel despreader 22, are input to channel estimation units 23-1, 23-2 and to the weighting calculation unit 13.

The channel estimation units 23-1, 23-2 compare the receive pilot signals $P_1'$, $P_2'$ and known pilot signals $P_1$, $P_2$ in order to obtain the channel estimation values from the transmit antennas 10-1, 10-2 of the base station to the receive antenna 12. The channel estimation units 23-1, 23-2 obtain channel impulse responses $h_1$, $h_2$, which indicate the state of amplitude and phase modulation ascribable to propagation of the receive pilot signals and input these responses to a receiving unit 21. The latter applies channel compensation processing to the data-channel signal and inputs the result to a demodulator and decoder, not shown.

The weighting calculation unit 13 finds weighting coefficients $w_1$, $w_2$ that will maximize the power P indicated by Equation (1) and outputs the feedback information FBI. That is, the weighting calculation unit 13 has a phase/amplitude comparator 13a for comparing the phases and the amplitudes of the pilot signals $P_1'$, $P_2'$ received from the transmit antennas 10-1, 10-2; and an FBI generator 13b for generating the feedback information FBI conforming to the weighting coefficients w1, w2 and inputting the information to the multiplexer 18. The latter multiplexes the feedback information and transmit data signal. A data modulator 25 performs orthogonal modulation based upon the multiplexed data, and a spread-spectrum modulator 26 applies spread-spectrum modulation and transmits an uplink data signal, which contains the feedback information, from the transmit antenna 14 toward the base station.

Handover

FIG. 12 illustrates an example of the structure of a conventional system at the time of handover. This illustrates an example of a case where handover is performed between two base stations 1 and 2. Components identical with those shown in FIG. 9 are designated by like reference characters. It should be noted that all antennas of base stations 1,2 and mobile station are used for both sending and receiving. Further, the feedback information extraction unit 16 and amplitude and phase controller 17 of FIG. 9 have been consolidated and are additionally provided with an antenna assigning function and illustrated as antenna assigning/weighting controllers 19, 19'. The base stations 1, 2 are identically constructed. Handover is carried out by sending and receiving messages in a higher-order layer between the base stations 1, 2, a base-station control unit 3, which serves as a host device, and the mobile station 4. The base stations 1 and 2 are each provided with two transceive antennas 10-1, 10-2 and 10-1', 10-2', respectively.

Before handover, the mobile station 4 receives the pilot signals $P_1$, $P_2$ currently being transmitted and calculates optimum weights $w_1$, $w_2$ of transmit diversity. Further, when the soft handover state is attained, the mobile station 4 receives signals from both base stations 1, 2 simultaneously, combines and outputs the diversities and calculates a control vector w that will maximize the following equation:

$$P = w^H (H_1^H H_1 + H_2^H H_2) w \quad (3)$$

where $H_k$ is the channel impulse response of the signal from a kth base station, $H_1$ can be estimated by the pilot signals $P_1$, $P_2$, and $H_2$ can be estimated by pilot signals $P_3$, $P_4$. After a changeover has been made to base station 2 by handover, antenna weights $W_3$, $W_4$ are calculated using the pilot signals $P_3$, $P_4$ of the base station 2 at the destination of handover.

In closed-loop transmit diversity in W-CDMA, use is made of HSDPA (High-Speed Downlink Packet Access), which is capable of high-speed data transmission in the downlink direction (see References 1, 2).

Reference 1: 3G TS 25.212 [$3^{rd}$ Generation Partnership Project: Technical Specification Group Radio Access Network; Multiplexing and channel coding (FDD)]

Reference 2: 3G TS 25.214 [$3^{rd}$ Generation Partnership Project: Technical Specification Group Radio Access Network; Multiplexing and channel coding (FDD)]

HSDPA will be described in brief below.

HSDPA

HSDPA is a method of adaptively controlling transmission rate in accordance with the radio environment between a radio base station and a mobile station and performs retransmission control H-ARQ (Hybrid Automatic Repeat reQuest) based upon receive success/failure. The principal radio channels used in HSDPA are (1) HS-SCCH (High Speed-Shared Control Channel), (2) HS-PDSCH (High Speed-Physical Downlink Shared Channel) and (3) HS-DPCCH (High SpeedDedicated Physical Control Channel), as illustrated in FIG. 13.

HS-SCCH and HS-PDSCH are both shared channels in the downlink direction (namely from the radio base station to the mobile station). HS-SCCH is a control channel that transmits various parameters relating to data transmitted on HS-PDSCH. In other words, it is a channel for giving notification of the fact that transmission of data is carried out via HS-PDSCH. Examples of the various parameters are the following items of information: destination information indicating to which mobile station data is to be transmitted, modulation scheme information indicating what modulation scheme is to be used to transmit data by HS-PDSCH, and information such as pattern of rate matching performed with respect to transmit data.

HS-DPCCH is a dedicated control channel in the uplink direction (namely the direction from the mobile station to the radio base station) and is used in a case where result (an ACK signal or NACK signal) of reception is transmitted to a radio base station in accordance with whether or not there is an error in data received by a mobile station via the HS-PDSCH. That is, HS-DPCCH is a channel used in order to transmit the result of reception of data received via the HS-PDSCH. If a mobile station has failed to receive data (if the receive data is a CRC error, etc.), the NACK signal is transmitted from the mobile station and therefore the radio base station executes retransmission. In addition, the HS-DPCCH is used in order that a mobile station, which has measured the reception quality (e.g., the SIR) of a signal received from a radio base station, may transmit this reception quality to the base station as a CQI (Channel Quality Indicator). That is, the CQI is information whereby the mobile station reports the reception environment to the base station. The CQI takes on values of 1 to 30. A CQI for which block error rate BLER does not exceed 0.1 in this reception environment is reported to the base station.

The radio base station determines whether the radio environment in the downlink direction is good or not based upon the received CQI. If the environment is good, a changeover is made to a modulation scheme whereby data can be transmitted at higher speed. Conversely, if the environment is no good, then a changeover is made to a modulation scheme in which data is transmitted at lower speed. (In other words, adaptive modulation is carried out.) In actuality, the base station holds a CQI table that defines formats of different transmission rates in accordance with CQIs of 1 to 30. The parameter (transmission rate, modulation scheme, number of multiplex codes, etc) conforming to the CQI is found from the CQI table and the data is transmitted to the mobile station on HS-PDSCH based upon the parameter.

Channel Structure

FIG. 14 is a diagram useful in describing channel timing in an HSDPA system. Since code division multiplexing is employed in W-CDMA, the channels are separated by codes. CPICH (Common Pilot Channel) and SCH (Synchronization Channel) are shared channels in the downlink direction. CPICH is a channel utilized in channel estimation and cell search, etc., at a mobile station, and is for transmitting a so-called pilot signal. Strictly speaking, the SCH includes a P-SCH (Primary SCH) and an S-SCH (Secondary SCH). These are channels on which a signal is transmitted in burst fashion by 256 chips at the beginning of each slot. The SCH is received by a mobile station that performs a three-stage cell search and is used to establish slot synchronization and frame synchronization and to identify the base-station code (scramble code). Although SCH has a length that is 1/10 of a slot, it is illustrated as having a larger width in FIG. 14. The other 9/10 of the slot is a P-CCPCH (Primary-Common Control Physical Channel).

The timing relationship of the channels will be described next. Each channel constructs one frame (10 ms) from 15 slots, and one frame has a length equivalent to 2560 chip lengths. Since the CPICH is used as a reference for other frames, as mentioned earlier, the leading ends of the frames of SCH and HS-SCCH coincide with the leading end of the frame of CPICH. On the other hand, the leading end of the frame of HS-PDSCH lags behind HS-SCCH, etc., by two slots. The reason for this is to make it possible for the mobile station to perform demodulation of HS-PDSCH by a demodulation scheme that corresponds to the modulation scheme after the information of this modulation scheme is received via the HS-SCCH. Further, HS-SCCH and HS-PDSCH each construct one subframe from three slots.

HS-DPCCH is a channel in the uplink direction. A first slot thereof is used to transmit the ACK/NACK signal, which indicates the result of reception of HS-PDSCH, from the mobile station to the radio base station upon elapse of approximately 7.5 slots following reception of HS-PDSCH. Second and third slots are used to feed back the CQI information for adaptive modulation control to the base station periodically. The CQI information transmitted is calculated based upon the reception environment (e.g., the result of measuring the SIR of CPICH) measured in an interval of the CQI transmission from four slots earlier to one slot earlier.

Handover at Time of Communication by HS-PDSCH and DPCH

If the mobile station 4 is handed over [see (B) of FIG. 15] owing to movement thereof when the mobile station is performing voice communication only on DPCH [see (A) of FIG. 15], the same voice data is sent from on DPCH from both base stations 1 and 2. The mobile station 4 therefore handles the receive signals from both base stations equivalently, calculates the weighting coefficient w in accordance with Equation (3) and feeds the signal back to each base station. Further, since the same voice data is sent on DPCH from both base stations, the mobile station diversity-combines the signals received from both base stations, outputs the result and produces diversity gain.

With W-CDMA that employs the HSDPA scheme, a case arises where communication by the HS-PDSCH is performed at the same time as communication by the DPCH in such a manner that the user may perform voice communication while browsing a website. In such simultaneous communication, if data (a packet) from the Internet is to undergo high-speed transmission, for example, the data is transmitted from base station 1 to mobile station 4 at high speed on HS-PDSCH. If voice (AMR voice data) does not utilize the HS channel, then voice data is transmitted from base station 1 to mobile station 4 on DPCH. If the handover state is attained during this simultaneous communication [see (C) of FIG. 15], the same voice data is sent from both base stations 1 and 2 on DPCH but packets are sent from only one base station, namely base station 1 with which the mobile station was communicating up to this point, or base station 4 with which the mobile station communicates after handover. For this reason, it has been proposed to obtain the weighting coefficient w by the following equation:

$$w = \arg\max w^H [\alpha H_1^H H_1 + (1-\alpha) H_2^H H_2] w \quad (4)$$

instead of Equation (3) in handover during communication on HS-PDSCH. In the equation above, the value of the coefficient α is selected to be between 0.5 and 1.0. If packet transmission via HS-PDSCH is from base station 1 and a is made 1.0 to stress the receive signal from base station 1, then the data (packet) on HS-PDSCH can be received in the best form. With regard to the voice data on DPCH, however, the voice data from base station 2 cannot be used, diversity gain is not obtained and voice quality declines. On the other hand, if a is made 0.5 and the receive signals from both base stations 1 and 2 are handled equally, diversity gain will be obtained with regard to the voice data and voice quality will be improved, though the receive quality of the data (packet) on HS-PDSCH will decline. In other words, a is in a trade-off relationship between HS-PDSCH and DPCH.

Accordingly, a method illustrated in FIG. 16 has been proposed (see Reference 3).

Reference 3: R1-02-1374 [TSG-RAN Working Group 1 meeting #29, Shanghai China, Nov. 5-8, 2002, Agenda item: 6.2-HSDPA Applicability of TX diversity (closed loop) modes, Title: Further Summation Results on Fast Switching proposal]

According to this method (referred to as a "Fast Switching Operation"), stress is placed upon the signal from base station 1 and α is made 1.0 during an HS service, and α is made 0.5 in order to achieve diversity gain during a non-HS service.

However, since packet data is transmitted via a shared channel even during a HS (high-speed transmission) service, the data will not necessarily be transmitted to the same mobile station every subframe.

Of course, even during an HS service (a state in which HS-SCCH is being monitored to prepare for reception on HS-PDSCH), data to be transmitted from the base station to this mobile station runs out and there are also instances where there is no transmission of packet data to this mobile station via the HS-PDSCH for some time.

Further, it is necessary to take into consideration the interval during which α is made 1.0 by the Fast Switching Operation, namely the interval during which weighting is applied to the signal received from the base station that transmits HS-PDSCH, as well as processing delay time needed to execute decision processing for applying weighting. FIG. 17 is a diagram for describing processing delay time. FIG. 17 illustrates two subframes (=six slots) of one frame (3 slots×5=15 slots). In a case where it has been specified to transmit a packet to a certain mobile station by the third slot SL3 of subframe SF1 of HS-SCCH in the handover state, a delay time TD is required until FBI prevailing at the time of α=1.0 is transmitted to the base station. That is, if t1 represents the time it takes for the mobile station to perform modulation and identify whether there is a packet addressed to it following receipt of HS-SCCH in subframe units, t2 represents the time needed to detect the phase difference of CPICH and calculate the weighting coefficient w from the phase difference, and t3 represents the time until FBI is decided from the weighting coefficient w and a transmission is made to the base station, then a delay time of TD=t1+t2+t3 will be required. As a consequence, at the start of the slot SL3' in which the base station transmits a packet, the transmitter cannot apply weighting conforming to the FBI prevailing at the time of α=1.0 and the performance of the Fast Switching Operation cannot manifest itself. Thus, in a case where data (a packet) transmitted to the mobile station itself is sent in bursts, i.e., in a case where data is transmitted intermittently by the scheduling of the base station, a problem which arises is that the performance of the Fast Switching Operation cannot manifest itself effectively.

SUMMARY OF THE INVENTION

Accordingly, an object of the present invention is to make it possible for the performance of the Fast Switching Operation to manifest itself effectively when data (a packet) arrives in burst-like fashion.

Another object of the present invention is to adaptively decide a time period over which weighting is applied upon taking packet arrival interval into consideration, in such a manner that the performance of the Fast Switching Operation will manifest itself effectively when a packet arrives in burst-like fashion.

A further object of the present invention is to control a weighting-control changeover interval in accordance with the reception interval of HS-PDSCH.

Weighting Control Method

According to the present invention, the foregoing objects are attained by providing a method of controlling weighting of a mobile station in a communication system for transmitting the same data from a plurality of base stations to a mobile station on a first channel and transmitting other data from one base station to the mobile station intermittently on a second channel during communication on the first channel. The weighting method comprises the steps of: in a first state in which the same data is being received from the plurality of base stations on the first channel and data is not being received on the second channel, deciding weight in such a manner that first weighting is applied to signals received from respective ones of the base stations and performing prescribed control based upon the signals to which the first weighting has been applied; in a second state in which the same data is being received from the plurality of base stations on the first channel and data is being received from one base station on the second channel, deciding a weight in such a manner that second weighting is applied to signals received from respective ones of the base stations and performing the prescribed control based upon the signals to which the second weighting has been applied; and adaptively controlling timing of transition from the second weighting to the first weighting when the second state has changed to the first state.

The adaptive control step includes monitoring intervals at which the second state occurs and, when the second state has changed to the first state, adaptively deciding timing of transition from the second weighting to the first weighting based upon the intervals.

When the communication system is a transmit diversity communication system in which a base station transmits data on first and second channels using a plurality of antennas, phase rotation information that is fed back to each base station is decided based upon the signals that have been weighted.

Mobile Station

According to the present invention, the foregoing objects are attained by providing a mobile station in a communication system for transmitting the same data from a plurality of base stations to a mobile station on a first channel and transmitting other data from one base station to the mobile station intermittently on a second channel during communication on the first channel. The mobile station comprises: a first receiver for receiving the same data from the plurality of base stations on the first channel; a second receiver for receiving other data from one base station intermittently on a second channel; a weight calculation unit which, in a first state in which the same data is being received from the plurality of base stations on the first channel and data is not being received from any base station on the second channel, is for deciding weight in such a manner that first weighting is applied to signals received from respective ones of the base stations, and in a second state in which the same data is being received from the plurality of base stations on the first channel and data is being received from one base station on the second channel, is for deciding a weight in such a manner that second weighting is applied to signals received from respective ones of the base stations; a transition timing decision unit for deciding a timing at which there is a transition from the second weighting to the first weighting when the second state has changed to the first state; and a controller for performing prescribed control based upon the weighted signals.

The transition timing decision unit includes an interval monitoring unit for monitoring intervals at which the second state occurs; and a timing decision unit for deciding, by statistical processing of the intervals, the timing at which there is a transition from the second weighting to the first weighting.

The interval monitoring unit includes a control-information demodulator/decoder for demodulating and decoding control information concerning whether or not data will be transmitted from a base station on the second channel during communication; and a state-change identification unit for recognizing a change in state based upon the control information.

The weight calculation unit includes means for causing a change from the second weighting to the first weighting in stages.

The weight calculation unit equalizes the weights of signals received from the plurality of base stations in the first weighting, and makes the weight of data received from a base station that transmits data on the second channel greater than the weight of data received from another base station in the second weighting. Further, the weight calculation unit decides the weight of the second weighting in accordance with types of service of the first and second channels.

In a transmit diversity communication system for transmitting data from a base station on first and second channels using a plurality of antennas, the controller decides phase rotation information, which is fed back to the base station, based upon the weighted signals from each of the base stations.

The present invention is such that when data (a packet) arrives in burst-like fashion, the timing at which a weight is changed is controlled adaptively taking packet arrival interval into account. As a result, it is possible for the performance of the Fast Switching Operation to manifest itself effectively even when there is a processing delay. That is, in a case where a packet is not being received, the base stations undergo diversity combination to produce a combined gain and improve reception quality. In a case where a packet is being received, the maximum performance can be obtained with regard to HS-PDSCH so that the reception quality of the packet can be improved. Further, when a packet arrives before the above-mentioned timing, intrinsic weighting for packet reception will already have been applied. As a result, a problem ascribable to processing delay in the prior art does not arise and the performance of the Fast Switching Operation can manifest itself effectively.

Further, in accordance with the present invention, weight is changed over in accordance with the type of service (service speed, etc.) on the first and second channels. As a result, performance of the Fast Switching Operation based upon a weight conforming to the service can manifest itself.

Further, in accordance with the present invention, it is so arranged that weight is changed successively. As a result, performance can manifest itself effectively even if there is some estimation error in the timing at which weight is changed.

Further, the present invention is such that in a transmit diversity communication system for transmitting data from a base station on first and second channels using a plurality of antennas, phase rotation information that is fed back to each base station can be decided based upon the signal from each base station while the performance of the Fast Switching Operation manifests itself effectively.

Other features and advantages of the present invention will be apparent from the following description taken in conjunction with the accompanying drawings.

BRIEF DESCRIPTION OF THE DRAWINGS

FIG. 4 illustrates examples of the structure of a weight calculation unit for generating FBI;

FIG. 7 is a diagram useful in describing a function for changing weight successively;

FIG. 15 is a diagram useful in describing a serving cell reference period and reference periods of a plurality of cells;

DESCRIPTION OF THE PREFERRED EMBODIMENTS

Overview of the Present Invention

Figure 1:
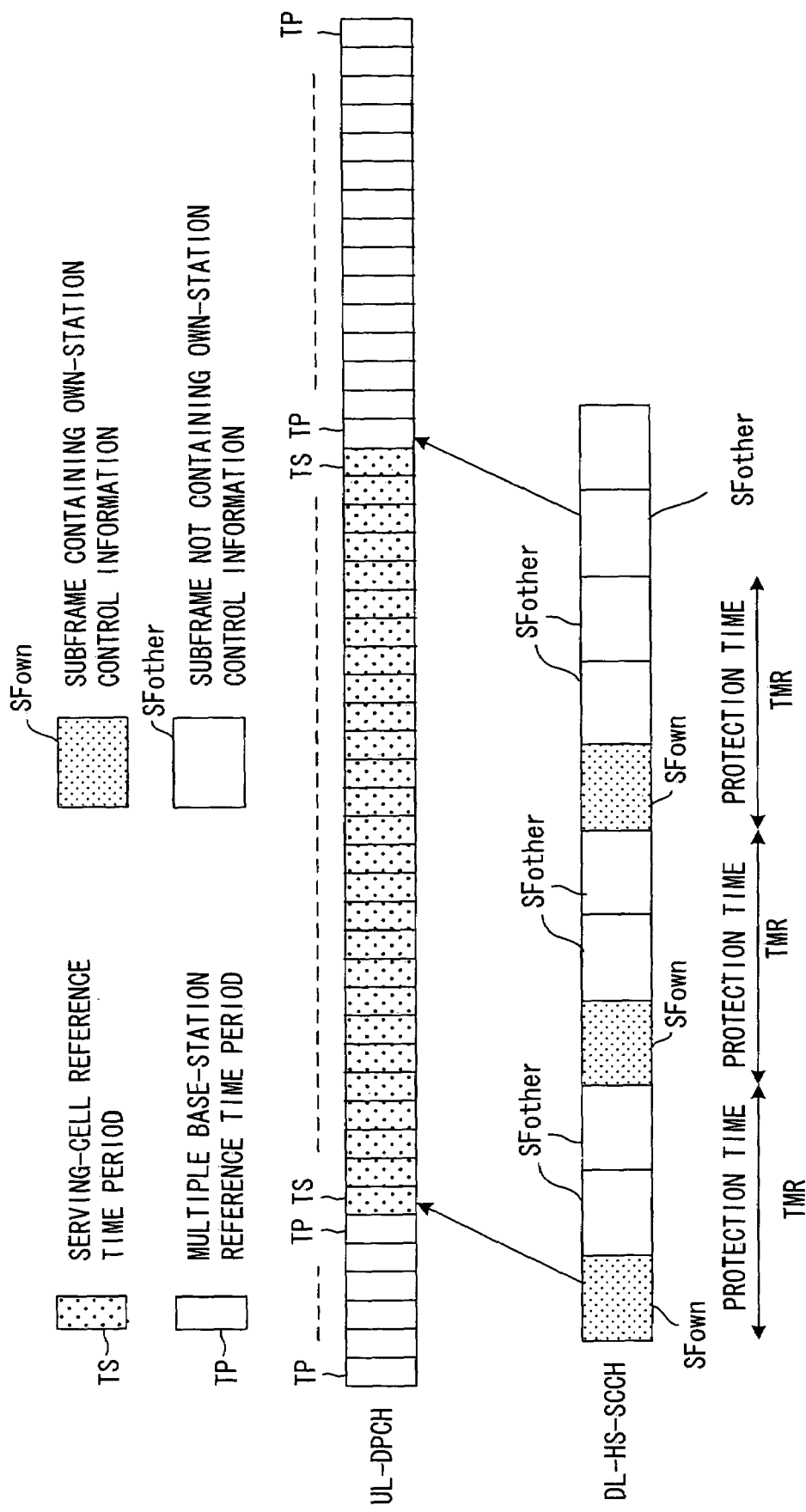
FIG. 1 is a diagram for describing an overview of the present invention.

The present invention relates to a method of controlling the weighting of a mobile station in a communication system, e.g., a transmit diversity communication system, for transmitting the same data (voice) from a plurality of base stations to a mobile station on a first channel (DPCH in W-CDMA) and transmitting other data (packet) from one base station to the mobile station intermittently on a second channel (HS-PDSCH in HSDPA) during communication on the first channel. This transmit diversity system transmits voice and packets from a base station on DPCH and HS-PDSCH using a plurality of antennas, applies weighting (phase rotation) to the base station in such a manner that phases of receive signals received by the mobile station from each of the antennas will coincide, and transmits the resultant signal.

When the mobile station is handed over and voice data is being received from a plurality of base stations on the first channel in this communication system, monitoring is performed to determine whether a state in which a packet will be received on the second channel has been attained. In a first state in which a packet is not received on the second channel, a weight is decided in such a manner that first weighting is applied to signals received from respective ones of the base stations, and phase rotation information, which is fed back to each base station, is decided based upon signals to which the first weighting has been applied. The first weighting is application of a weight that will equalize the weights of signals received from the plurality of base stations.

On the other hand, in a second state (packet reception state) in which voice data is received from a plurality of base stations on the first channel and a packet is received on the second channel, a weight is decided in such a manner that first weighting is applied to signals received from respective ones of the base stations, and phase rotation information, which is fed back to each base station, is decided based upon signals to which the second weighting has been applied. With second weighting, the weight of a signal received from a base station that transmits data on the second channel is made greater than the weight of a signal received from another base station.

When the second state has changed to the first state (a state in which a packet has not yet been transmitted), the timing of transition from second weighting to first weighting is controlled adaptively. That is, the packet arrival intervals are monitored and the average interval is found. When the second state has changed to the first state (a state in which a packet has not yet been transmitted), second weighting is changed to first weighting at a timing that occurs upon passage of the average-interval time from the moment of the change in state. If this arrangement is adopted, a change is made to the first weight in a case where a packet does not arrive even though the predicted weight-change timing has arrived. As a result, if a packet arrives during this time, control can be performed immediately at the rightful second weight. This makes it possible for the performance of the Fast Switching Operation to manifest itself effectively.

FIG. 1 is a diagram useful in describing an overview of the present invention. In this transmit diversity communication system, it will be assumed that the mobile station is in the handover state.

During communication, the mobile station receives a subframe SF, which includes control information, from a base station on the shared control channel HS-SCCH. The subframe contains information as to whether a packet will be transmitted to its own station by HS-PDSCH, which is the second channel. Based upon this control information, the mobile station identifies whether a packet addressed to itself will be sent to it. If the HS-SCCH subframe is a subframe $SF_{own}$ that contains control information about the mobile station itself, then the mobile station feeds phase control information (FBI) back to the base station on the uplink dedicated channel DPCH upon elapse of a prescribed period of time, adopts 1.0 as the weight of a receive signal from a packet transmitting base station (a serving base station) and adopts 0.0 (second weighting) as the weight of a receive signal from another base station. A control period in which phase rotation information is thus decided based upon a receive signal solely from a serving base station and the information is fed back to the base station shall be referred to as a "serving-cell reference time period TS". Further, a control period in which equal weighting (first weighting) is applied to a signal received from each base station and the phase rotation information is decided shall be referred to as a "multiple base-station reference time period TP".

Once the serving-cell reference time period TS arrives, serving-cell reference time periods continue until a protection time TMR elapses. Accordingly, if the subframe $SF_{own}$ that contains the control information about the mobile station itself is received before the protection time TMR elapses, serving-cell reference time periods continue until the protection time TMR elapses again. The protection time TMR is the average interval of intervals at which packets arrive at the mobile station per se. In FIG. 1, the average interval is 3×subframe cycles. Accordingly, even in a case where the subframes $SF_{own}$ that contain the control information about the mobile station itself are intermittent, as illustrated in FIG. 1, the serving-cell reference time periods continue and the second weighting state is in effect during this time. Consequently, when a packet arrives within the serving-cell reference time period, second weighting will already be in effect. This means that the problem ascribable to processing delay will not arise and that the performance of the Fast Switching Operation can manifest itself effectively.

However, if the subframe $SF_{own}$ that contains the control information about the mobile station itself is not received before the protection time TMR elapses, or in other words, if the subframe $SF_{own}$ that contains the control information about the mobile station itself is received successively even though the protection time TMR has been exceeded, the period is made the multiple base-station reference time period TP, weighting is made the first weighting and the phase rotation information is decided.

Base Station

Figure 2:
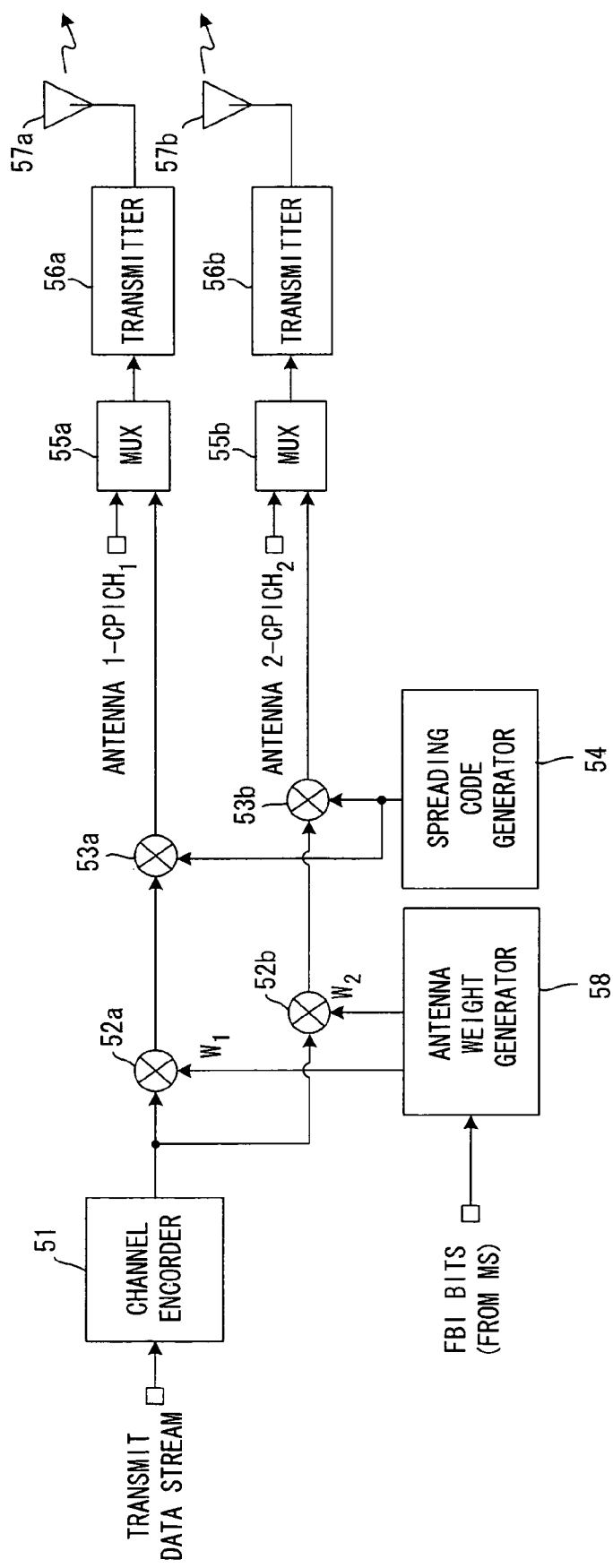
FIG. 2 is a block diagram of a base station according to the present invention.

FIG. 2 is a block diagram of a base station according to the present invention. This is a case where two transmit antennas are used. A channel encoder 51 encodes a transmit data stream in accordance with a prescribed encoding scheme and outputs the result. Multipliers 52a, 52b multiply the encoded transmit data by weighting coefficients w1, w2, spreaders 53a, 53b multiply the transmit data by a spreading code that is output from a spreading code generator 54, multiplexers 55a, 55b multiplex mutually orthogonal pilot patterns $CPICH_1$, $CPICH_2$ for antennas 1 and 2, respectively, onto the transmit data, and transmitters 56a, 56b subject the multiplexed signals to a digital-to-analog conversion, apply orthogonal modulation, up-convert the frequency of the obtained signals to obtain RF signals and transmit the resultant signals from transmit antennas 57a, 57b. A mobile station (not shown) receives the signals transmitted from the transmit antennas 57a, 57b, calculates phase rotation information for rotating the phase of the transmit data in such a manner that the phases of the two receive signals will coincide, creates FBI information conforming to the phase rotation information and sends this information to the base station. An antenna weight generating unit 58 of the base station generates the weighting coefficients w1, w2 based upon the FBI information and inputs these coefficients to the multipliers 52a, 52b, respectively. Transmission control similar to that described above is thenceforth carried out. It should be noted that there is a case where the transmit data stream is only voice data based upon a DPCH, a case where it is only packets based upon HS-PDSCH and a case where it is voice and packets based upon DPCH and HS-PDSCH.

Mobile Station

Figure 3:
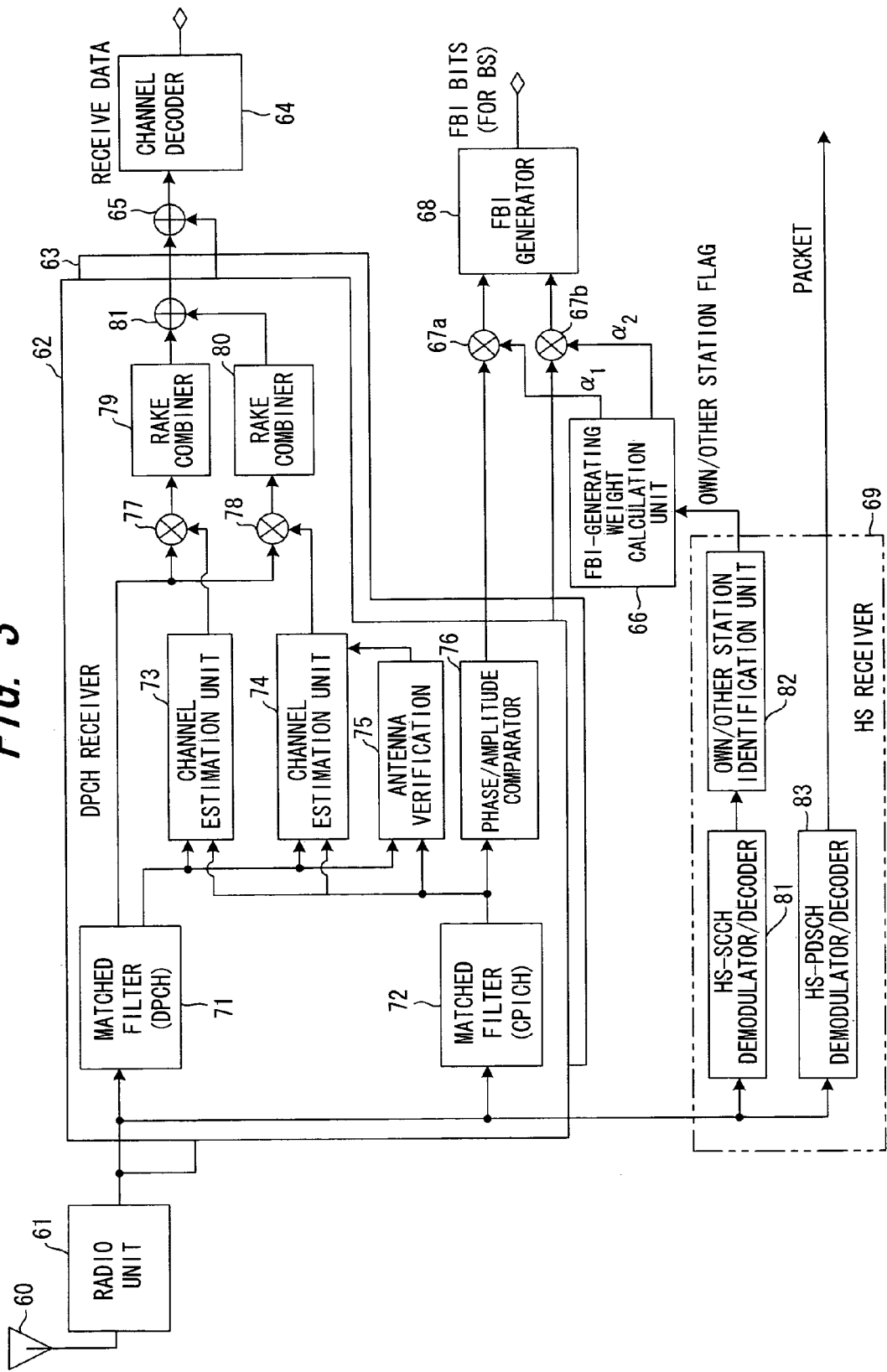
FIG. 3 is a block diagram of the principal components of a mobile station.

FIG. 3 is a block diagram illustrating the principal components of a mobile station. A radio unit 61 subjects an RF signal, which has been received by an antenna 60, to a frequency down-conversion to thereby effect a conversion to a baseband signal, applies orthogonal demodulation and an analog-to-digital conversion and inputs the resultant signal to receivers 62, 63 for first and second base stations, respectively.

A matched filter 71 for DPCH in the DPCH receiver 62 of the first base station outputs a signal (e.g., voice code) that arrives via each path of multipath, the signal being obtained by multiplying the baseband signal by the spreading code of DPCH that has been assigned to the mobile station. Meanwhile, a matched filter 72 of the shared pilot channel CPICH generates a pilot for antennas 1 and 2 by multiplying the baseband signal, which enters from the radio unit 61, by the spreading code of CPICH for antennas 1 and 2 multiplexed at the base station, inputs the pilot signal for antenna 1 to a channel estimation unit 73 of antenna 1, an antenna verification unit 75 and a phase/amplitude comparator 76, and inputs the pilot signal for antenna 2 to a channel estimation unit 75 of antenna 2, the antenna verification unit 75 and the phase/amplitude comparator 76. The channel estimation unit 73 for antenna 1 estimates the channel from the transmit antenna 57a of the base station to the receive antenna 60, and a channel estimation unit 74 for antenna 2 estimates the channel from the transmit antenna 57b of the base station to the receive antenna 60. Using the FBI information transmitted by its own station, the error rate of the FBI information at the base station and the dedicated pilot signal received, the antenna verification unit 75 estimates weight vectors $w_1$, $w_2$ (transmit weight components) produced by the base station, corrects the channel estimation values by the estimated values and makes them signals that can be RAKE combined. The phase/amplitude comparator 76 finds the phase difference between the CPICH signals received from the transmit antennas 57a, 57b and outputs the phase difference and amplitude ratio.

Based upon the channel estimation values, the channel compensation units 77, 78 apply channel compensation to the voice signal that is output from the matched filter 71. RAKE combiners 79, 80 combine the signals that arrive from the transmit antennas via multipath, and a combiner 81 diversity-combines the signals transmitted from each of the transmit antennas. A channel decoder 64 applies error-correction decoding and outputs the result. It should be noted that in a case where the same data is being received from two base stations by DPCH, as at the time of handover, the outputs of the receivers 62 and 63 are combined (diversity combining is performed between the two base stations) by the combiner 65 and the combined signal is input to the channel decoder 64.

An FBI-generating weight calculation unit 66, described later, calculates FBI-generating weight coefficients α1, α2 by which signals that are used to generate the feedback information (FBI) of phase rotation are multiplied. Multipliers 67*a*, 67*b* multiply the phase differences and amplitude ratios, which are output from the phase/amplitude comparators 76 in the receivers 62, 63 of the first and second base stations, by the FBI-generating weight coefficients α1, α2, and an FBI generator 68 calculates phase rotation information [the weighting coefficient w (w$_1$, w$_2$) for phase rotation] based upon the outputs of the multipliers 67*a*, 67*b*, creates FBI information conforming to the weighting coefficient and sends the information to the base station. More specifically, the phase/amplitude comparator 76, multipliers 67*a*, 67*b* and FBI generator 68 cooperate to decide the weighting coefficient w for phase rotation based upon Equation (4), create the FBI information conforming to this weighting coefficient for phase rotation and send this information to the base station. In this case, α, (1−α) in Equation (4) become the FBI-generating weight coefficients α1, α2, respectively (α=α1, 1−α=α2). In a state that is not the handover state, α=1 holds and α1=1, α2=0 hold. Further, in the handover state, (1) α1=0.5, α2=0.5 holds in the first state, in which the same data (e.g., voice) is being received from the first and second base stations on the first channel DPCH and no data (packet) is being received from any base station on the second channel HS-PDSCH. (2) Further, α1=1.0, α2=0.0 holds in the second state, in which the same data (voice) is being received from the first and second base stations on the first channel DPCH and data (a packet) is being received from the first base station on the second channel HS-PDSCH. It should be noted that it is also possible to establish the relation α1=0.7, α2=0.3, etc.

An HS receiver 69 has an HS-SCCH demodulator/decoder 81 for demodulating and decoding HS-SCCH transmitted from the base station and outputting control information, and an own/other station identification unit 82 for referring to the control information to determine whether a subframe contains information concerning this station per se, and inputting an own/other station flag that is the result of the determination to the FBI-generating weight calculation unit 66. Further, an HS-PDSCH demodulator/decoder 83 demodulates and decodes HS-PDSCH transmitted from the base station and outputs packet data.

FBI-Generating Weight Calculation Unit

FIG. 4 illustrates examples of the structure of the FBI-generating weight calculation unit 66. As illustrated at (A), the FBI-generating weight calculation unit 66 comprises a scheduling storage unit 91 for monitoring the intervals (packet intervals) of subframes that include information concerning the unit's own station; a protection time decision unit 92 for deciding the protection time TMR; and a weight calculation processor 93 for calculating the weights α1, α2 for producing the FBI. The protection time TMR is the average interval of intervals at which packets arrive at the unit's own station, as described in FIG. 1.

(a) Processing for Deciding Protection Time

Figure 5:
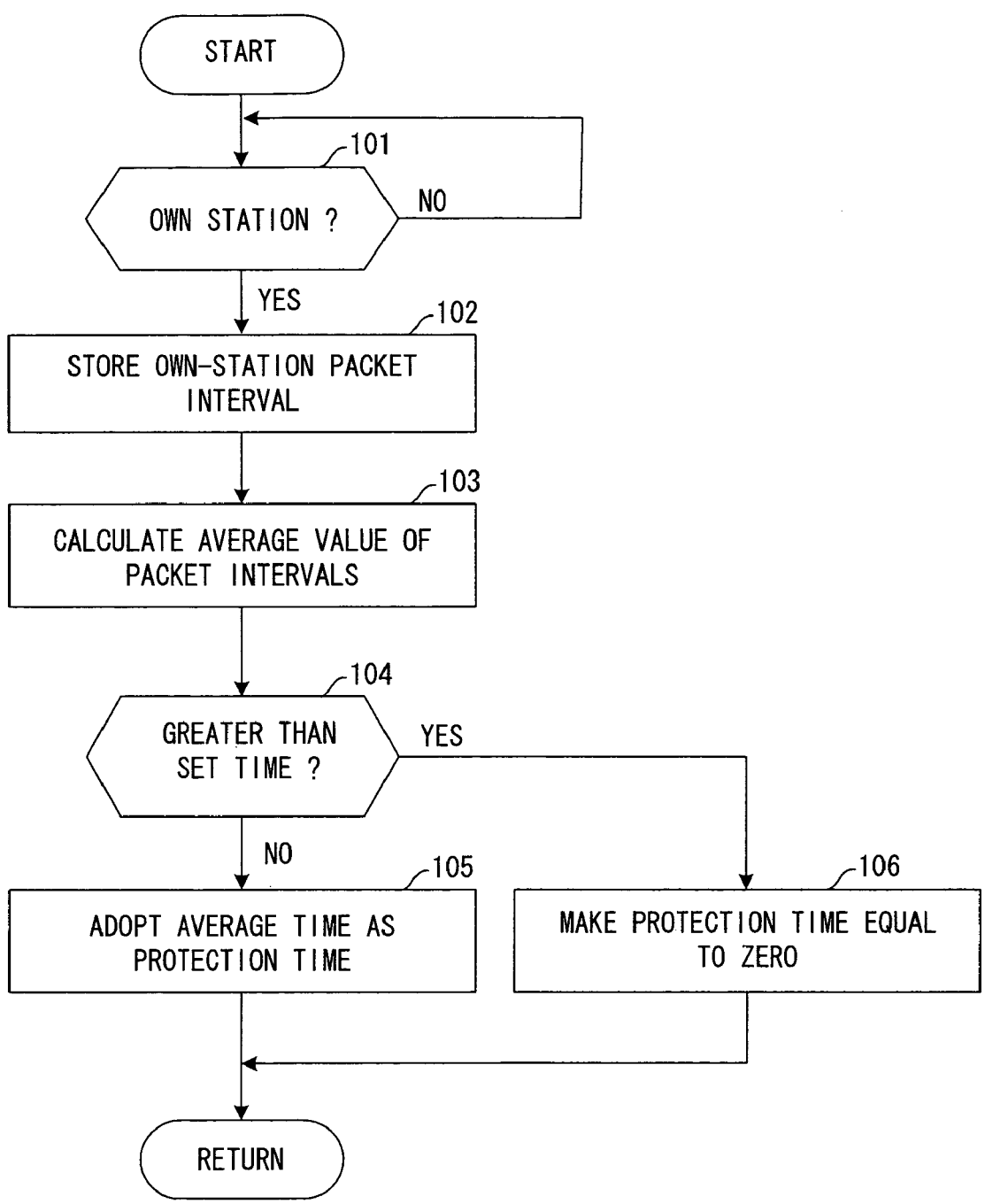
FIG. 5 is a flowchart of processing for deciding protection time.

FIG. 5 is a flowchart of processing for deciding protection time. The scheduling storage unit 91 performs monitoring to determine whether the own/other station flag indicates own station (step 101). If the station is own station, then the interval of the subframe that includes the own-station control information, namely the packet arrival interval, is found and stored (step 102). The protection time decision unit 92 subjects a plurality of packet arrival intervals stored in the scheduling storage unit 91 to statistical processing, e.g., calculates the average value of these intervals (step 103), determines whether the average value is larger than a set time (step 104), adopts the average value as the protection time TMR if the average value is smaller (step 105) and makes the protection time TMR equal to zero if the average value is larger (step 106).

(b) Processing for Calculating Weight

Figure 6:
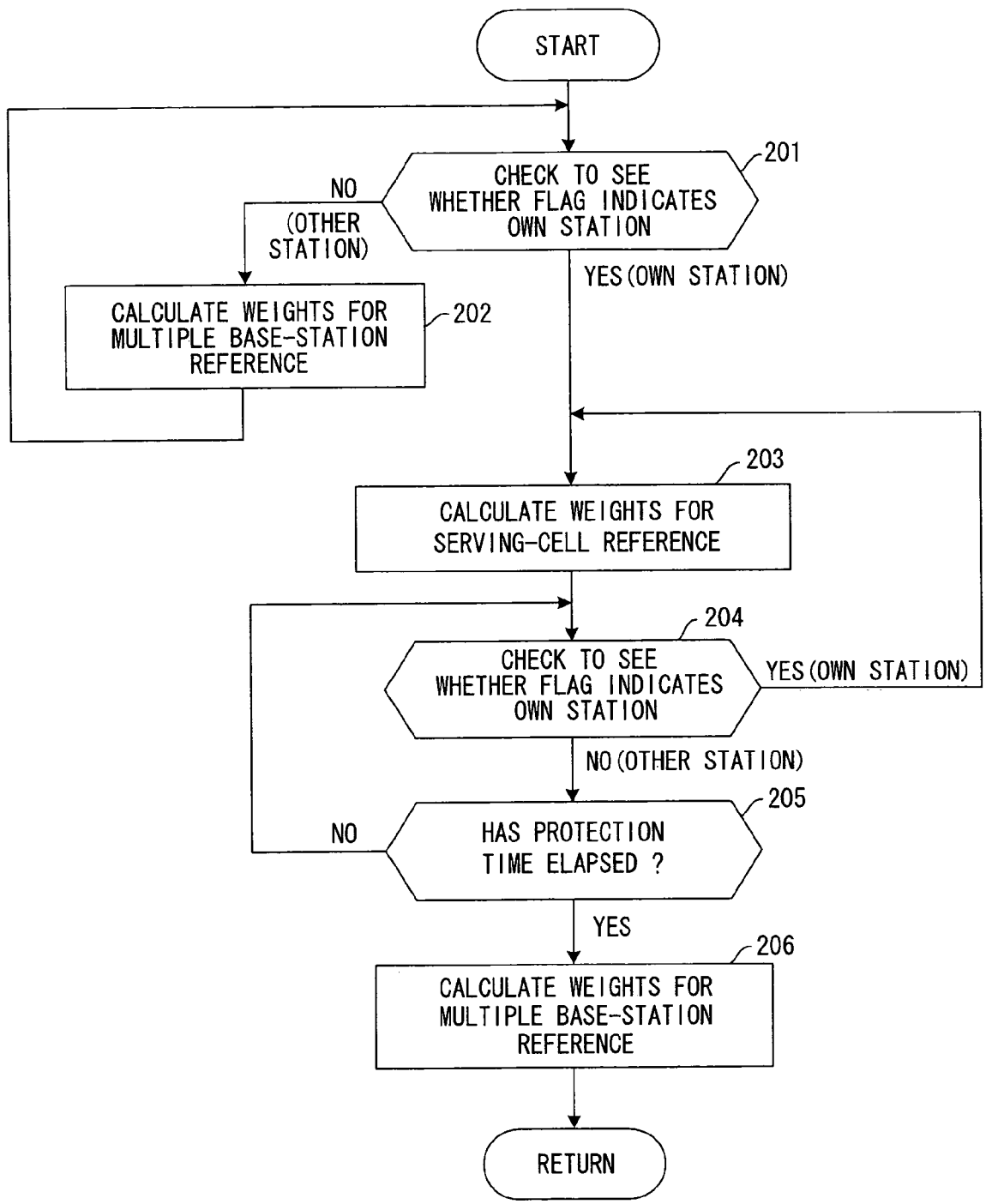
FIG. 6 is a flowchart of processing by a weight calculation processor for calculating FBI-generating weights.

FIG. 6 is a flowchart of weight calculation processing executed by the weight calculation processor 93. It will be assumed that the mobile station is in the handover state and that the first base station is presently communicating (i.e., that it is the serving base station).

At start-up it is determined whether the own/other station flag, which is output based upon the control information of HS-SCCH, indicates own station, i.e., whether a subframe that includes own-station control information has been received (step 201). If the flag indicates another station, then the mobile station judges that the state is the first state, in which the same data (e.g., voice) is received from the first and second base stations on the first channel DPCH and a packet is not received from the first base station on the HS-PDSCH, and outputs the weights α1, α2 for multiple base-station reference (step 202). The weights α1, α2 for multiple base-station reference are as follows: α1=α2=0.5

The processing of steps S201 and S202 is repeated. If it is found at step S201 that the own/other station flag indicates own station, then the mobile station judges that the state is the second state, in which the same data (e.g., voice) is received from the first and second base stations on the first channel DPCH and a packet is received from the first base station on the HS-PDSCH, calculates and outputs the weights α1, α2 for serving-cell reference and resets elapsed time to zero (step 203). The weights α1, α2 for serving-cell reference are as follows: α1=1.0, α2=0.0.

It is then determined whether the own/other station flag indicates own station (step 204). If the decision rendered is "YES", then output of the weights α1, α2 for serving-cell reference is continued at step 203. On the other hand, if the own/other station flag indicates another station, then it is determined whether elapsed time has exceeded the protection time TMR (step 205). If the decision is "NO", control returns to step 204 to await the next flag and processing from step 204 onward is repeated.

If it is found at step 205 that the elapsed time has exceeded the protection time TMR, i.e., if a self-addressed packet has not arrived even upon elapse of the protection time TMR, it is determined that the first state has been attained, the weights α1, α2 for multiple base-station reference are calculated and output (step 206) and control returns to the beginning.

The reason for making the protection time TMR equal to zero at step 106 in FIG. 5 when the average time of the intervals (packet arrival intervals) at which the own-information containing subframes arrive is greater than the set time is to prevent a decline in the reception quality of voice that would result if the weights for serving-cell reference (the second weighting) were to be maintained over an extended period of time in which packets do not arrive.

Thus, as described in conjunction with FIG. 1, once a subframe containing own-station control information is received, the weights (second weighting) for serving-cell reference can be maintained continuously until the protection time TMR has elapsed. As a result, when a packet arrives within the serving-cell reference time period, second weighting will already be in effect. This means that the problem ascribable to processing delay will not arise as in the prior art and that the performance of the Fast Switching Operation can manifest itself effectively. That is, the maximum performance is obtained on the HS-PDSCH.

Further, if a subframe that contains own-station control information is not received before the protection time TMR elapses, then a changeover is made to the weights (first weighting) for multiple base-station reference. As a result, it is possible to obtain gain (diversity gain) that is the result of combining both signals transmitted from a plurality of base stations. This makes it possible to improve the quality of received voice.

First Modification

The changeover from second weighting to first weighting is protection time TMR. The protection time TMR is predicted by the average of the intervals at which the subframes containing own-station information arrive. However, the prediction is not on the mark every time. Improving the precision of the prediction, therefore, is important. In a first modification, α1, α2 are controlled as indicated for example at (A) or (B) of FIG. 7 in such a manner that the weights (α1=0.5, α2=0.5) due to first weighting will be obtained at the predicted slot position. If this arrangement is adopted, it is possible to obtain a Fast Switching Operation of some degree of performance even if arrival of a subframe containing own-station control information is delayed owing to prediction error.

In FIG. 4, (B) is a block diagram of the FBI-generating weight calculation unit 66 according to the first modification, in which components identical with those of (A) of FIG. 4 are designated by like reference characters. This modification differs in that it is provided with a function generator 94 to which the protection time TMR is input for generating a function f(t) indicated in (A) or (B) of FIG. 7, and in that the weight calculation processor 93 outputs the FBI-generating weights α1, α2 that change in accordance with the function f(t).

Second Modification

The first embodiment is a case where the weights (second weighting) for serving-cell reference are fixed at α1=1.0, α2=0.0. However, the weights can also be changed depending upon the service. For example, the weights are made α1=0.7, α2=0.3 in the case of a combination of voice (AMR) of 12.2 kbps and a packet of 384 kbps, and are made α1=0.9, α2=0.1 in the case of a combination of voice (AMR) of 12.2 kbps and a packet of 7 Mbps. If this arrangement is adopted, it is possible to employ an appropriate weight that conforms to the service.

In FIG. 4, (C) is a block diagram of the FBI-generating weight calculation unit 66 according to the second modification, in which components identical with those of (A) of FIG. 4 are designated by like reference characters. This modification differs in that it is provided with a correspondence table 95 indicating the correspondence between service type and weight, and in that the weight calculation processor 93 changes the serving-cell reference weights depending upon the service combination.

Figure 8:
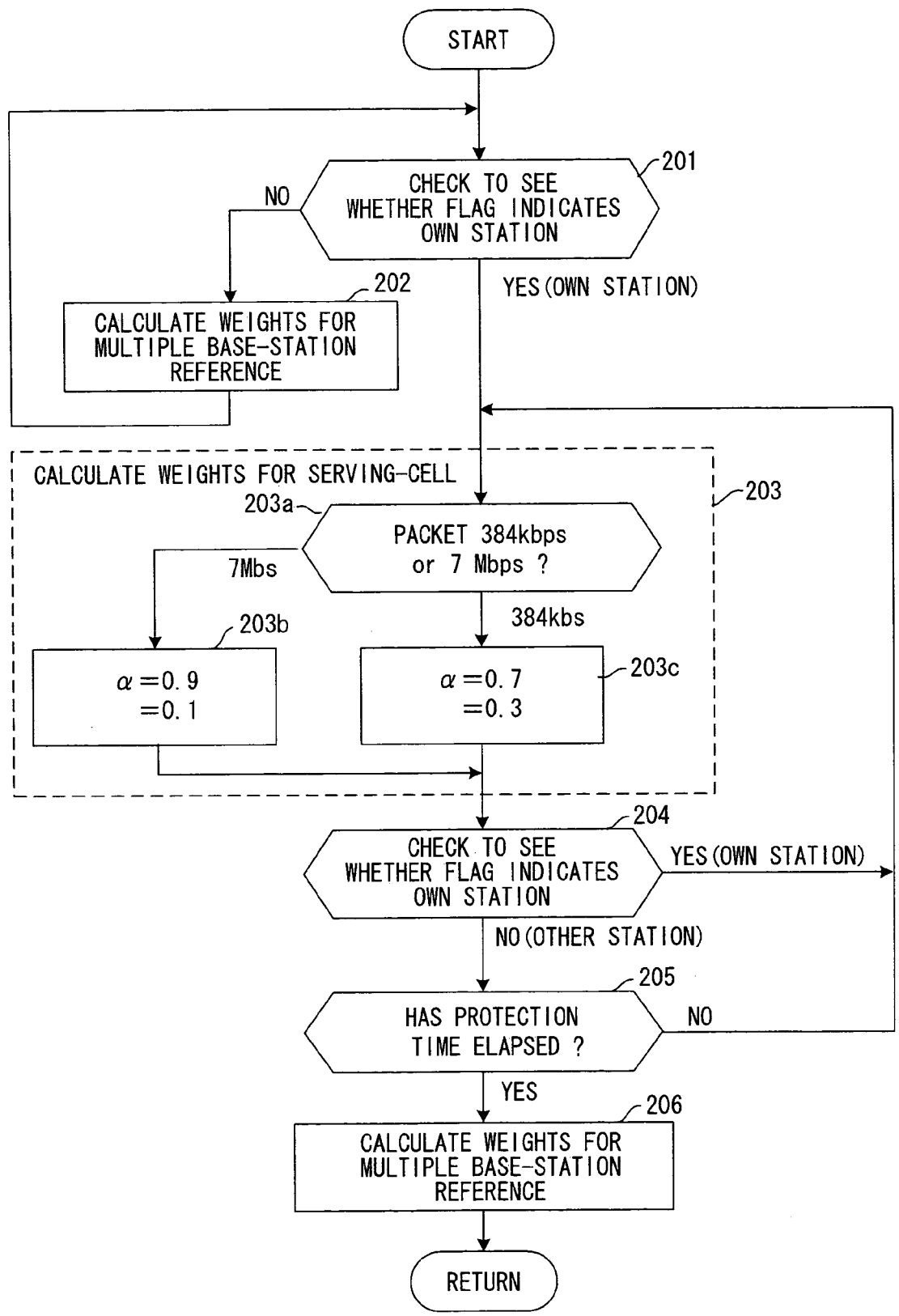
FIG. 8 is a flowchart of processing by a weight calculation processor for calculating FBI-generating weights in a second modification.
Figure 9:
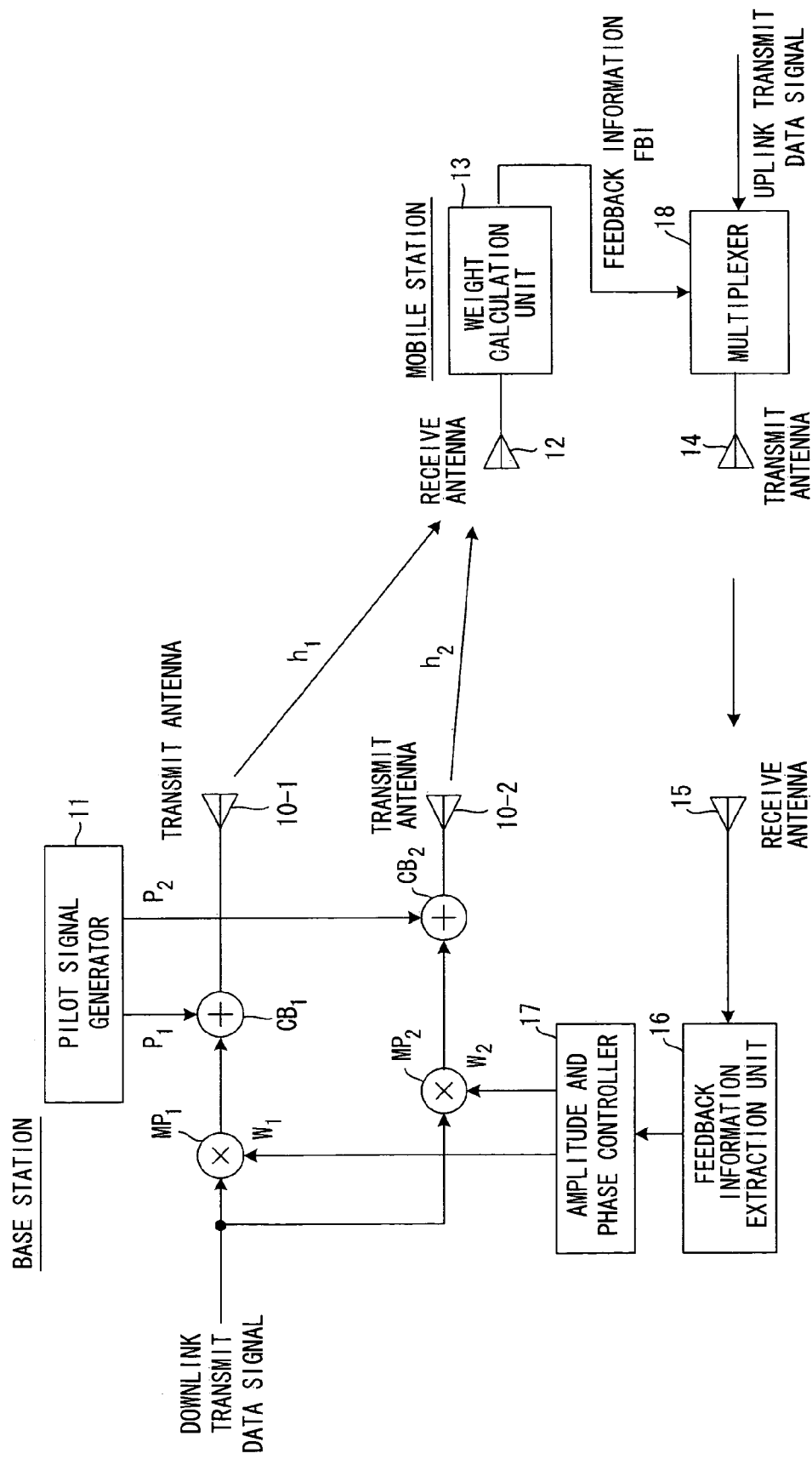
FIG. 9 is a diagram useful in describing a closed-loop transmit diversity communication system in W-CDMA according to the prior art.
Figure 10:
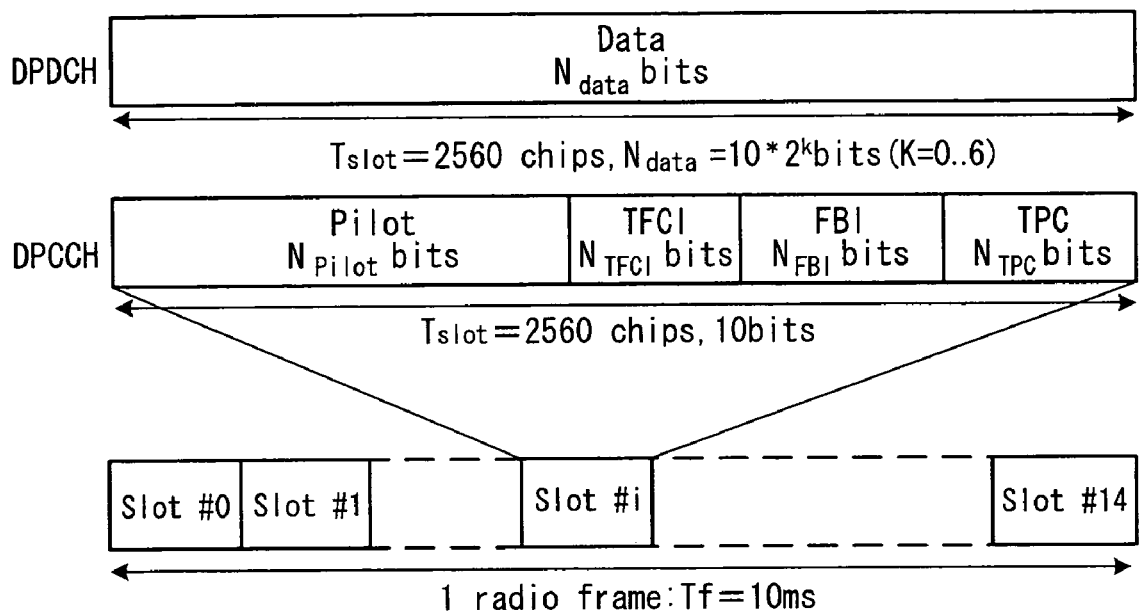
FIG. 10 is a diagram showing the structure of an uplink DPCH (Dedicated Physical Channel) frame standardized by 3GPP.
Figure 11:
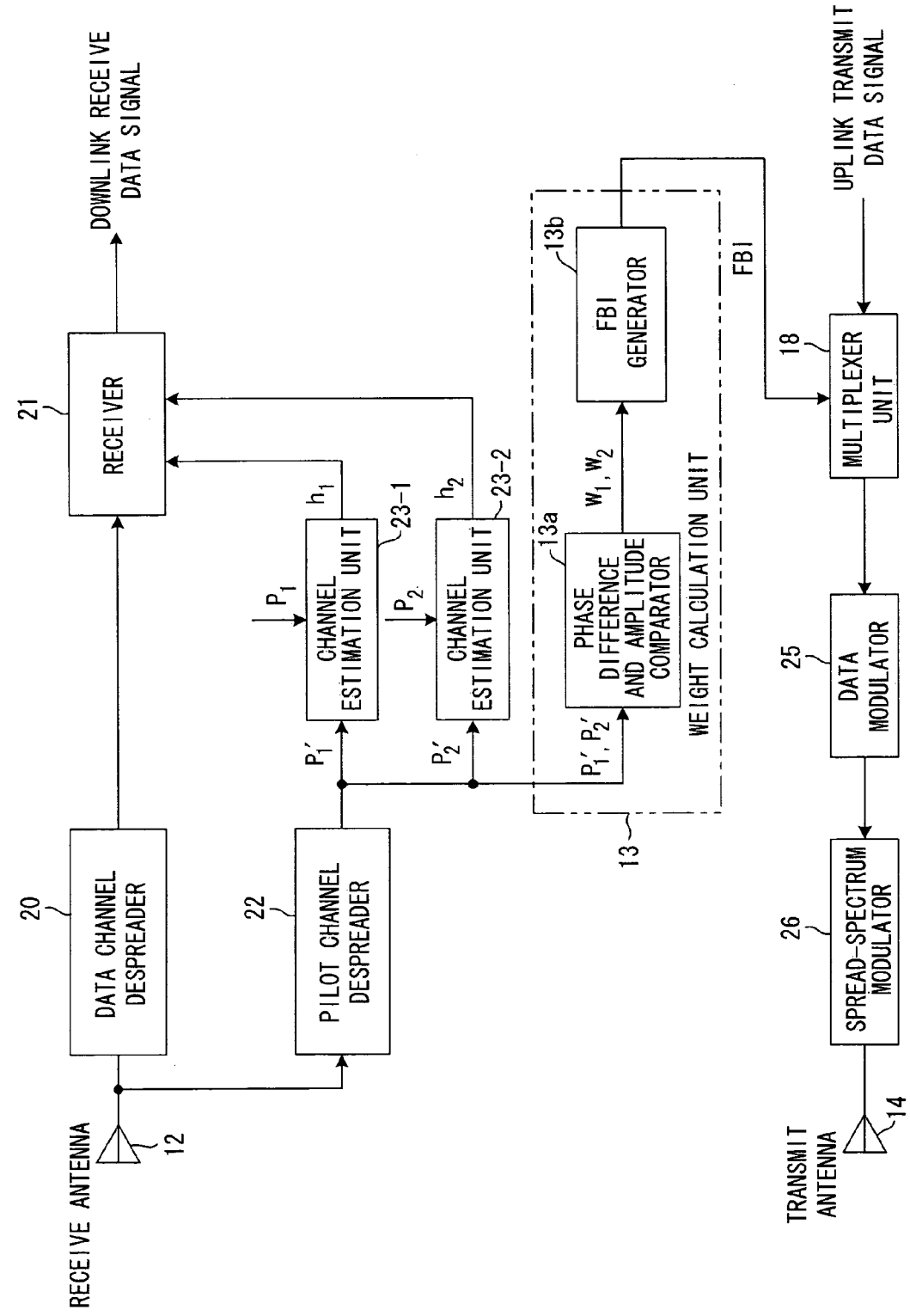
FIG. 11 illustrates an example of the structure of a radio mobile station according to the prior art.
Figure 12:
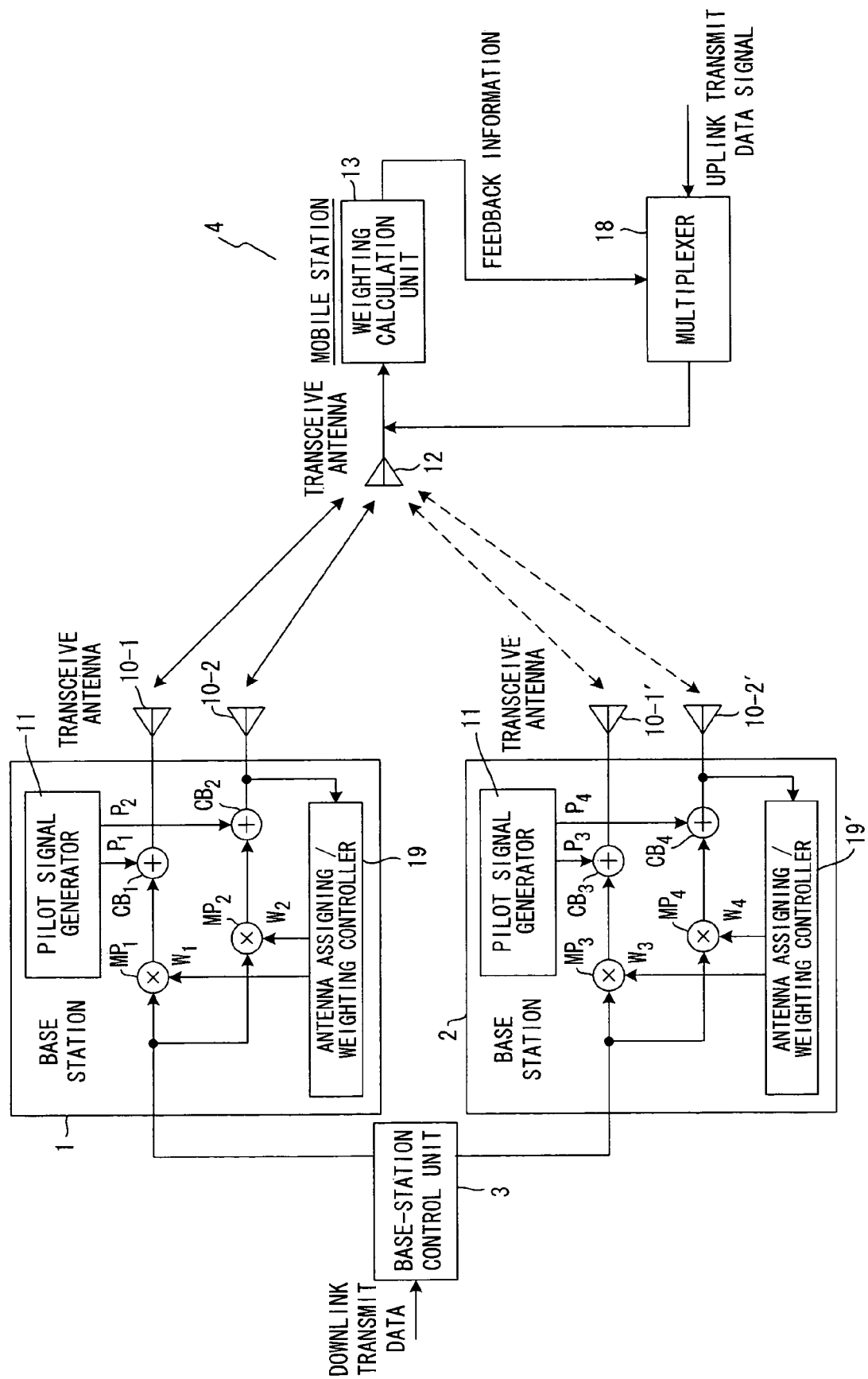
FIG. 12 illustrates an example of the structure of a conventional system at the time of handover.
Figure 13:
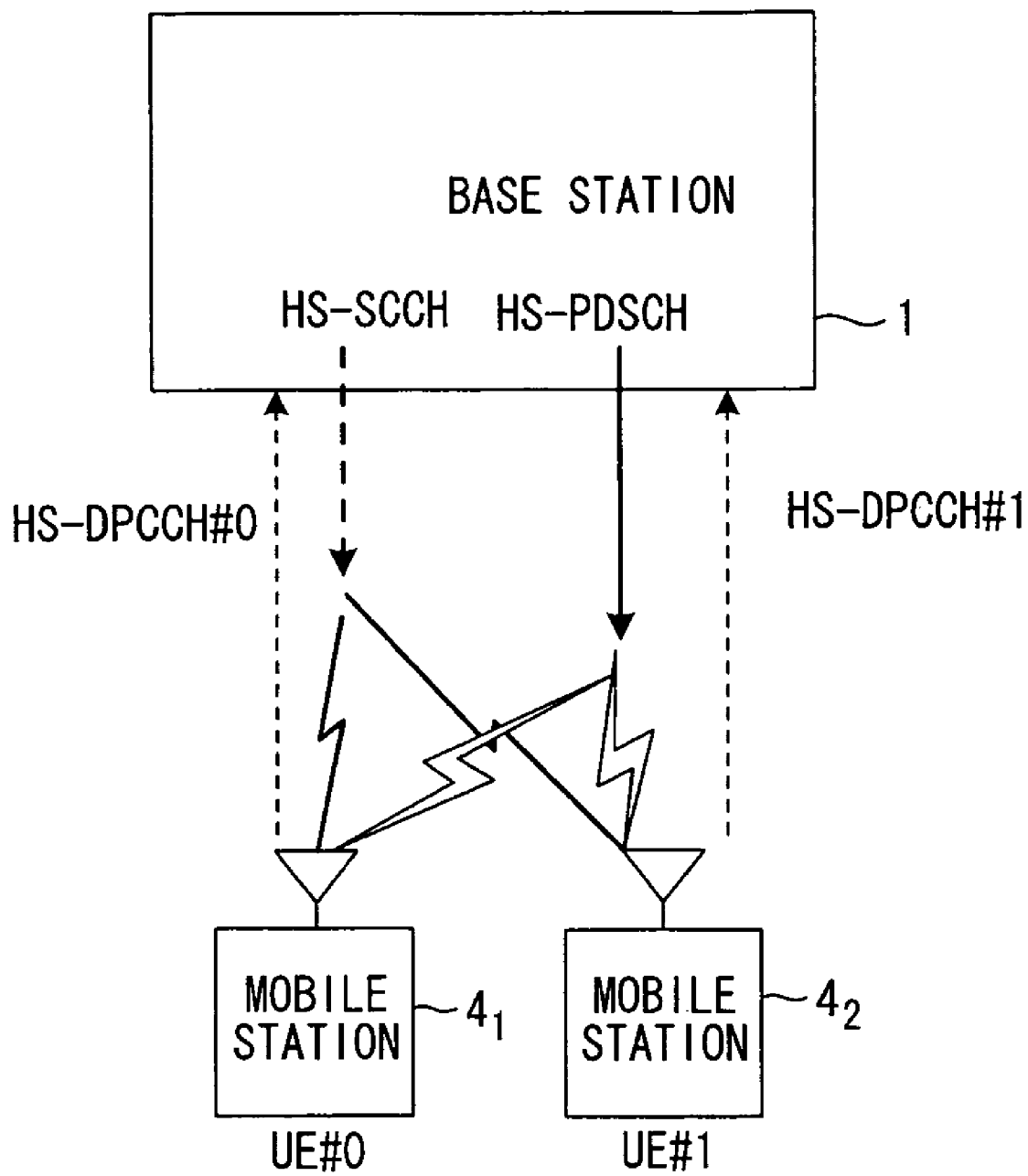
FIG. 13 is a diagram useful in describing the main radio channels used in HSDPA.
Figure 14:
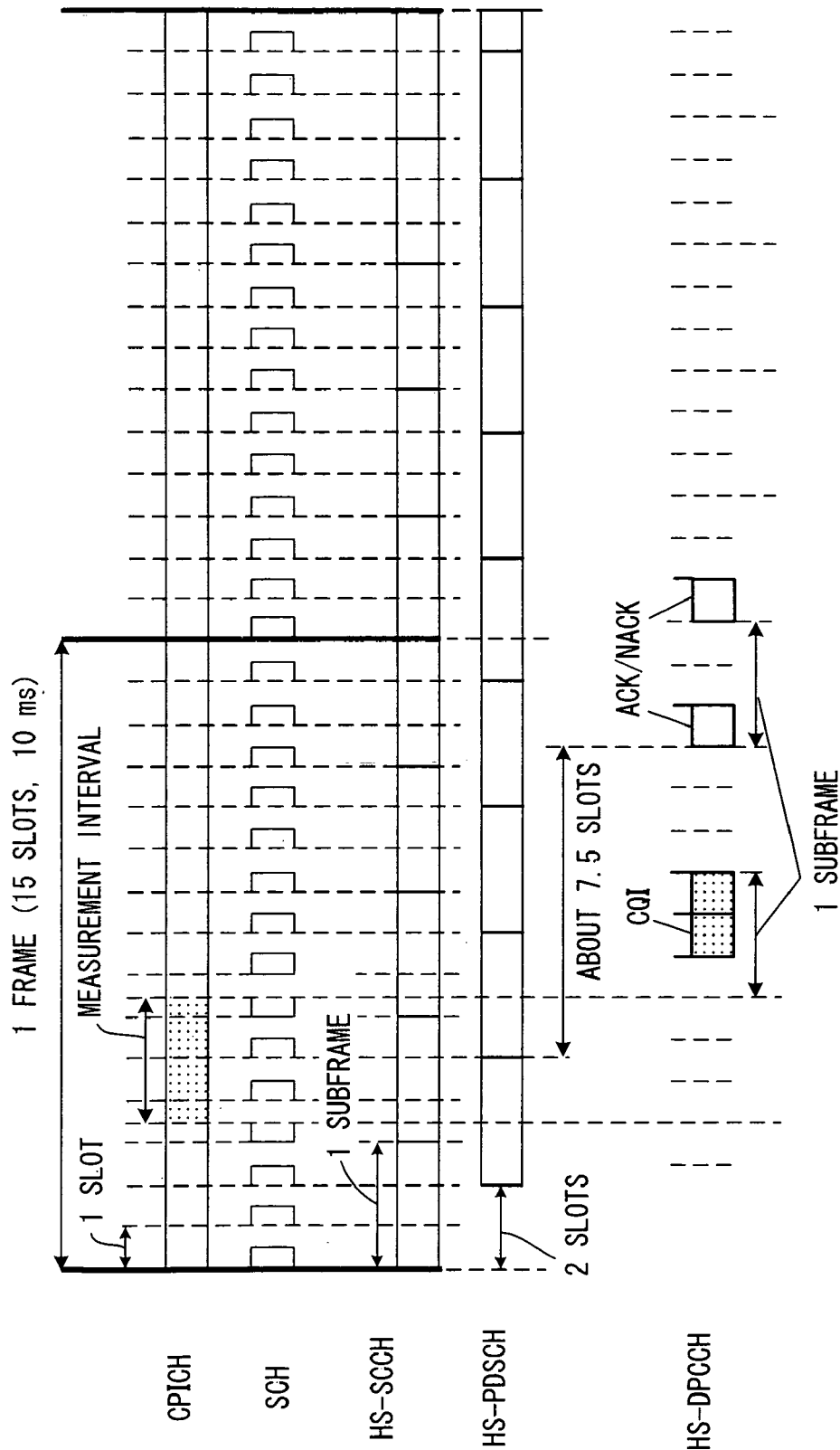
FIG. 14 is a diagram useful in describing the timings of channels in an HSDPA system.
Figure 16:
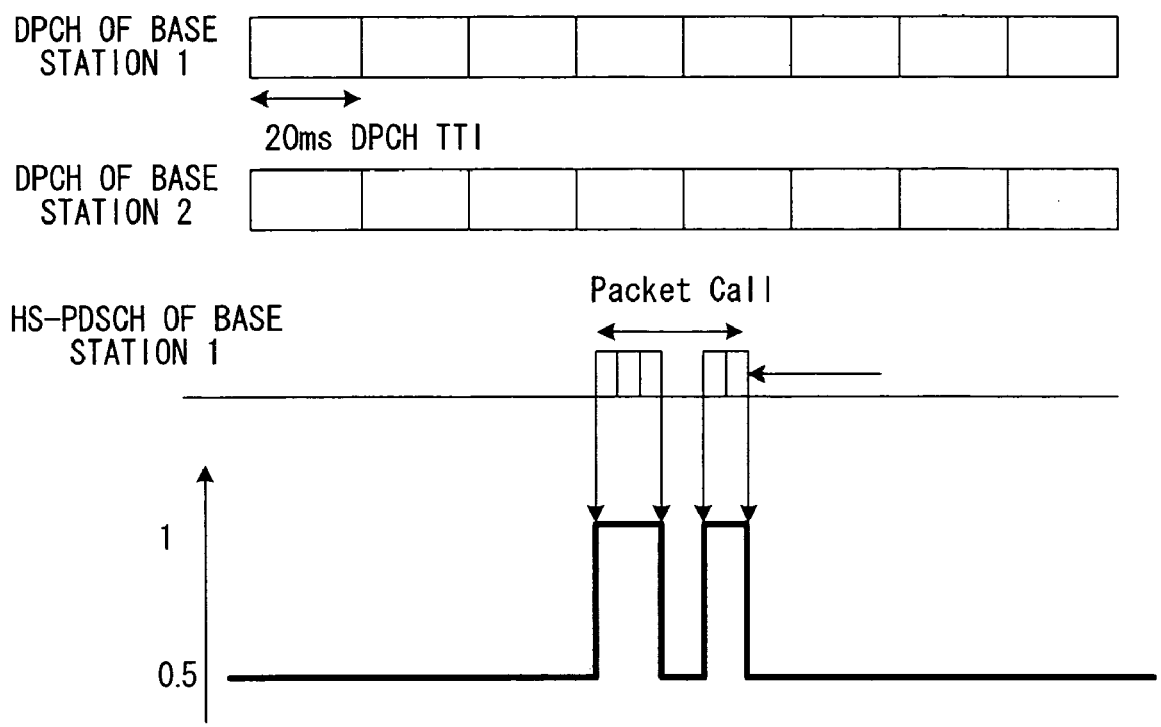
FIG. 16 is a diagram useful in describing a method (Fast Switching Operation) in which stress is placed on a signal from a serving base station and α is made 1.0 only during packet communication, and α is made 0.5 in order to achieve diversity gain when packet communication is not in progress.
Figure 17:
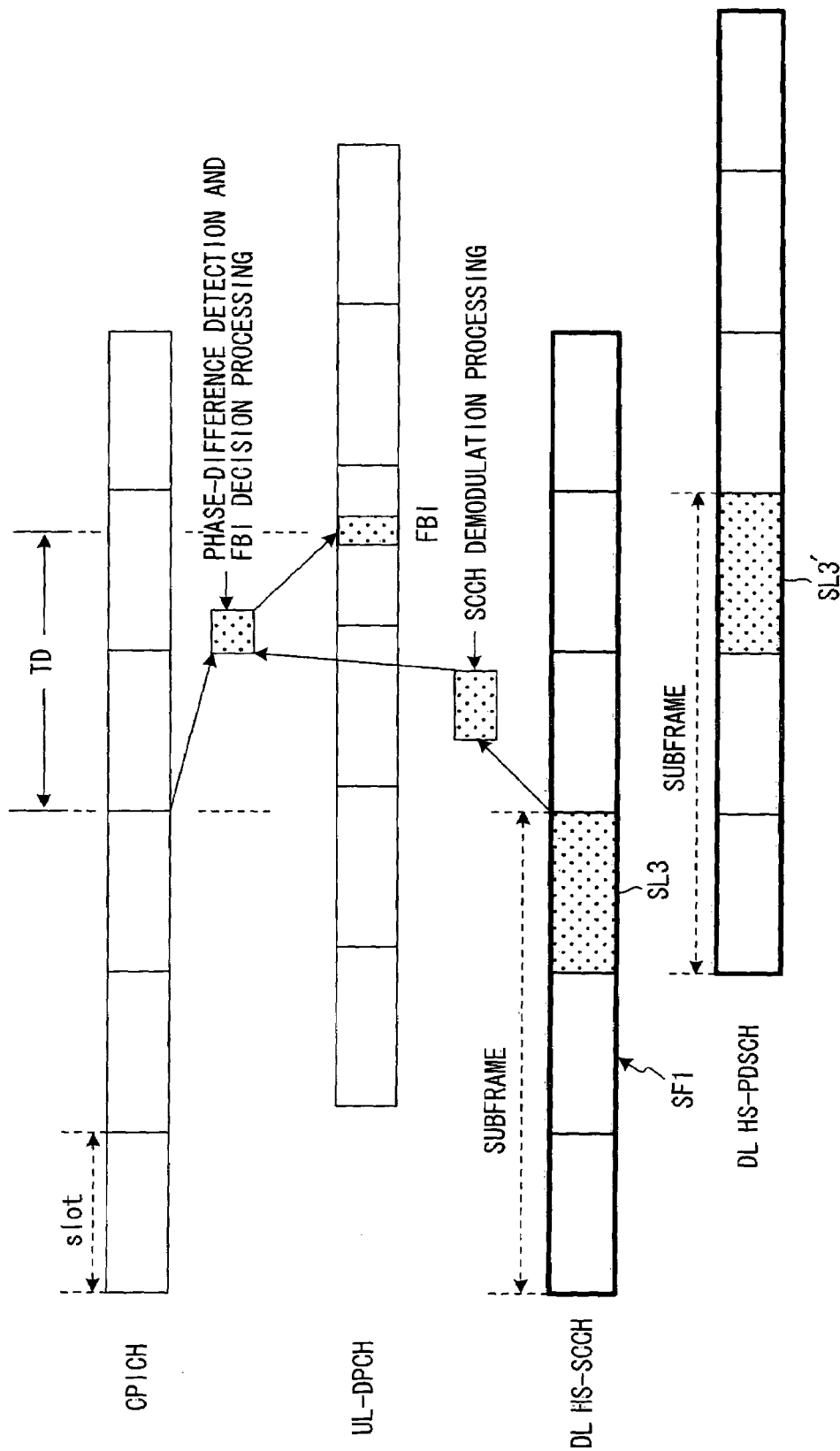
FIG. 17 is a diagram useful in describing processing delay time.

FIG. 8 is a flowchart of processing by the weight calculation processor 93 for calculating the FBI-generating weights. The only difference from the flowchart of the first embodiment in FIG. 6 is the processing of step 203. If a subframe containing own-channel control information is received at step 201, it is determined whether the packet speed is 384 kbps or 7 Mbps (step 203a). If the packet speed is 7 Mbps, then the weight α1 of the first base station of the serving cell is made 0.9 and the weight α2 of the second base station that is a non-serving cell is made 0.1 (step 203b). On the other hand, if the packet speed is 384 kbps, then the weight α1 of the first base station of the serving cell is made 0.7 and the weight α2 of the second base station of the non-serving cell is made 0.3 (step 203c). Processing is thenceforth executed from step 204 onward.

Third Modification

First and second modes will be defined before a third modification is described.

First mode: This is a mode in which phase control relating to first and second antennas of a first base station and phase control relating to third and fourth antennas of a second base station are made equivalent. That is, this is a mode in which α=0.5 holds.

Second mode: This is a mode in which the interval at which HS-PDSCH is received from the first base station is measured and phase control relating to the first and second antennas is performed at a priority higher than that of phase control relating to the third and fourth antennas of the second base station in accordance with the result of measurement. That is, this is a mode in which α=1.0 holds.

The third modification is such that in the second mode, a mobile station determines using HS-SCCH, etc. whether data has been transmitted to this station itself from the first base station by HS-PDSCH, and measures the transmission interval. If the measured period is longer than the reference, the mode is changed from the second mode to the first mode. Preferably, the changeover is made to the second mode and the FBI transmission is performed so as to be in time for phase control of HS-PDSCH predicted to be transmitted next based upon the measured transmission interval.

If the measured period is shorter than the reference, however, the second mode is maintained after HS-PDSCH is received. Preferably, the changeover is made to the first mode if there is no transmission to this station itself according to the HS-SCCH corresponding to the HS-PDSCH predicted to be transmitted next based upon the measured transmission interval. If this arrangement is adopted, the length of time to establish the first mode is controlled based upon the relationship between the transmission interval and reference interval. Accordingly, the mode will not be fixed to the second mode for too long in a case where the HS-PDSCH transmission interval is long.

Furthermore, it can be so arranged that the changeover between the first and second modes is specified by the base station. In such case the mobile station receives data of the same content from both a first base station, which transmits data of the same content by antenna diversity using first and second antennas, and a second base station, which transmits data of the same content by antenna diversity using third and fourth antennas. In a case where the first base station is a base station (a serving cell) that transmits HS-PDSCH to a mobile station using the first and second antennas, the first base station transmits a command signal A via a dedicated channel before transmission of HS-SCCH. The command signal A is for giving phase control relating to the first and second antennas of the first base station a higher priority than phase control relating to the third and fourth antennas of the second base station. The mobile station receives the command signal A via the dedicated channel transmitted from the first base station and transmits a signal for phase control in accordance with the command signal to the first and second base stations.

By way of example, the base station acquires the command signal A before transmission of HS-SCCH when the amount of data that has accumulated as data to be transmitted to the mobile station via the HS-PDSCH has exceeded a stipulated amount or when a scheduler notifies the base station of the fact that transmission of HS-PDSCH is planned.

Conversely, in another example, a command signal B can also be transmitted from the first base station. The command signal B is for giving phase control relating to the third and fourth antennas of the second base station a higher priority than phase control relating to the first and second antennas of the first base station. In this case, the base station has acquires the command signal B before transmission of HS-SCCH when the amount of data that has accumulated as data to be transmitted to the mobile station via the HS-PDSCH is less than a stipulated amount or when the scheduler notifies the base station of the fact that transmission of HS-PDSCH is not planned. It should be noted that if this signal has been transmitted, control is exercised in such a manner that HS-PDSCH will not be transmitted to the mobile station until the command signal A is transmitted.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling weighting of a mobile station in a communication system for transmitting the same data from a plurality of base stations to a mobile station on a first channel and transmitting other data from one base station to the mobile station intermittently on a second channel during communication on the first channel, said method comprising:

in a first state in which the same data is being received from the plurality of base stations on the first channel and data is not being received on the second channel, a step of deciding weight in such a manner that first weighting is applied to signals received from respective ones of the base stations and performing prescribed control based upon the signals to which the first weighting has been applied;

in a second state in which the same data is being received from the plurality of base stations on the first channel and data is being received from one base station on the second channel, a step of deciding a weight in such a manner that second weighting is applied to signals received from respective ones of the base stations and performing the prescribed control based upon the signals to which the second weighting has been applied; and an adaptive control step of adaptively controlling timing of transition from the second weighting to the first weighting when the second state has changed to the first state.

2. The method according to claim 1, wherein said adaptive control step includes:

an interval monitoring step of monitoring an interval at which the second state occurs; and when the second state has changed to the first state, adaptively deciding timing of transition from the second weighting to the first weighting based upon the interval.

3. The method according to claim 2, wherein if the interval is greater than a set interval, a transition is made from second weighting to first weighting immediately when the second state has changed to the first state.

4. The method according to claim 2, wherein said interval monitoring step includes receiving, during communication, control information concerning whether or not data will be transmitted from a base station on the second channel, recognizing a change in state based upon this control information and monitoring the interval at which the second state occurs.

5. The method according to claim 2, wherein the second weighting is changed to the first weighting successively.

6. The method according to claim 1, wherein the weights of signals received from the plurality of base stations are equalized in the first weighting and the weight of a signal received from a base station that transmits data on the second channel is made greater than the weight of data received from another base station in the second weighting.

7. The method according to claim 6, wherein weight based upon the second weighting is decided in accordance with types of service of the first and second channels.

8. The method according to claim 1, wherein when the communication system is a transmit diversity communication system in which a base station transmits data on first and second channels using a plurality of antennas, phase rotation information that is fed back to each base station is decided based upon the signals that have been weighted.

9. A mobile station in a communication system for transmitting the same data from a plurality of base stations to a mobile station on a first channel and transmitting other data from one base station to the mobile station intermittently on a second channel during communication on the first channel, said mobile station comprising:

a first receiver for receiving the same data from the plurality of base stations on the first channel;

a second receiver for receiving other data from one base station intermittently on a second channel;

a weight calculation unit which, in a first state in which the same data is being received from the plurality of base stations on the first channel and data is not being received from any base station on the second channel, is for deciding weight in such a manner that first weighting is applied to signals received from respective ones of the base stations, and in a second state in which the same data is being received from the plurality of base stations on the first channel and data is being received from one base station on the second channel, is for deciding a weight in such a manner that second weighting is applied to signals received from respective ones of the base stations;

a transition timing decision unit for deciding a timing at which there is a transition from the second weighting to the first weighting when the second state has changed to the first state; and a controller for performing prescribed control based upon the weighted signals.

10. The mobile station according to claim 9, wherein said transition timing decision unit includes:

an interval monitoring unit for monitoring intervals at which the second state occurs; and a timing decision unit for deciding, by statistical processing of the intervals, the timing at which there is a transition from the second weighting to the first weighting.

11. The mobile station according to claim 10, wherein if said interval is greater than a set time, then said transition timing decision unit decides that a transition is to be made from second weighting to first weighting immediately when the second state has changed to the first state.

12. The mobile station according to claim 10, wherein said interval monitoring unit includes:

a control-information demodulator/decoder for demodulating and decoding control information concerning whether or not data will be transmitted from a base station on the second channel during communication; and a state-change identification unit for recognizing a change in state based upon the control information.

13. The mobile station according to claim 10, wherein said weight calculation unit includes means for causing a successive change from the second weighting to the first weighting.

14. The mobile station according to claim 9, wherein said weight calculation unit equalizes the weights of signals received from the plurality of base stations in the first weighting, and makes the weight of data received from a base station that transmits data on the second channel greater than the weight of data received from another base station in the second weighting.

15. The mobile station according to claim 14, further comprising a weight holding unit for holding the second weight in association with types of service of the first and second channels;
  wherein said weight calculation unit decides the weight of the second weighting in accordance with types of service of the first and second channels.

16. The mobile station according to claim 9, wherein in a transmit diversity communication system for transmitting data from a base station on first and second channels using a plurality of antennas, said controller decides phase rotation information, which is fed back to the base station, based upon the weighted signals from each of the base stations.

17. A mobile station for receiving data of the same content from both a first base station, which transmits data of the same content by antenna diversity using first and second antennas, and a second base station, which transmits data of the same content by antenna diversity using third and fourth antennas, comprising:
  a weighting phase controller for changing a length of time over which phase control relating to the first and second antennas of the first base station is performed at a priority higher than that of phase control relating to the third and fourth antennas of the second base station in accordance with a reception interval of HS-PDSCH transmitted using the first and second antennas.

18. The mobile station according to claim 17, wherein the reception interval is decided based upon result of measurement by a measurement unit that measures a reception interval of data via HS-PDSCH transmitted by the first base station using the first and second antennas, or based upon information transmitted from the first base station.

19. A mobile station for receiving data of the same content from both a first base station, which transmits data of the same content by antenna diversity using first and second antennas, and a second base station, which transmits data of the same content by antenna diversity using third and fourth antennas, said mobile station having:
  a receiver which, in a case where the first base station is a base station that transmits HS-PDSCH to the mobile station using the first and second antennas, is for receiving a command signal from said first base station, said command signal being a signal for giving phase control relating to the first and second antennas of the first base station a higher priority than phase control relating to the third and fourth antennas of the second base station; and
  a transmitter for transmitting a signal for phase control in accordance with the command signal to the first and second base stations.

20. The base station according to claim 19, wherein the command signal is transmitted before transmission of HS-SCCH, which gives advance notice of transmission of HS-PDSCH.

* * * * *